(12) United States Patent
Andrus et al.

(10) Patent No.: US 8,577,169 B2
(45) Date of Patent: Nov. 5, 2013

(54) DIGITAL IMAGE PROCESSING AND SYSTEMS INCORPORATING THE SAME

(75) Inventors: Jeremy C. Andrus, Zeeland, MI (US); Jon H. Bechtel, Holland, MI (US); Tom B. Sherman, Ada, MI (US)

(73) Assignee: Gentex Corporation, Zeeland, MI (US)

( * ) Notice: Subject to any disclaimer, the term of this patent is extended or adjusted under 35 U.S.C. 154(b) by 738 days.

(21) Appl. No.: 12/658,002

(22) Filed: Feb. 1, 2010

(65) Prior Publication Data
US 2010/0195901 A1  Aug. 5, 2010

Related U.S. Application Data

(60) Provisional application No. 61/149,049, filed on Feb. 2, 2009, provisional application No. 61/155,691, filed on Feb. 26, 2009, provisional application No. 61/181,770, filed on May 28, 2009, provisional application No. 61/222,532, filed on Jul. 2, 2009.

(51) Int. Cl.
*G06K 9/40* (2006.01)

(52) U.S. Cl.
USPC ............ 382/274; 382/166; 382/232; 382/302

(58) Field of Classification Search
USPC .................. 382/274, 166, 232, 302
See application file for complete search history.

(56) References Cited

U.S. PATENT DOCUMENTS

| | | |
|---|---|---|
| 5,717,791 A | 2/1998 | Labaere et al. |
| 5,909,244 A * | 6/1999 | Waxman et al. ........... 348/222.1 |
| 6,396,505 B1 | 5/2002 | Lui et al. |
| 6,466,333 B1 | 10/2002 | Schoolcraft et al. |
| 6,993,200 B2 | 1/2006 | Tastl et al. |
| 7,010,174 B2 | 3/2006 | Kang et al. |
| 7,103,260 B1 | 9/2006 | Hinson |
| 7,142,723 B2 | 11/2006 | Kang et al. |
| 7,146,059 B1 | 12/2006 | Durand et al. |
| 7,239,757 B2 | 7/2007 | Kang et al. |
| 7,305,144 B2 | 12/2007 | Fattal et al. |
| 7,317,843 B2 | 1/2008 | Sun et al. |
| 7,376,288 B2 | 5/2008 | Huang et al. |
| 7,454,136 B2 | 11/2008 | Raskar et al. |
| 7,483,486 B2 | 1/2009 | Mantiuk et al. |
| 7,492,375 B2 | 2/2009 | Toyama et al. |
| 7,519,907 B2 | 4/2009 | Cohen et al. |
| 7,783,121 B1 | 8/2010 | Cox |
| 7,889,949 B2 | 2/2011 | Cohen et al. |

(Continued)

OTHER PUBLICATIONS

C. Tomasi & R. Manduchi, Bilateral Filtering for Gray and Color Images, Proceedings of the 1998 IEEE International Conference on Computer Vision, Bombay, India.

(Continued)

*Primary Examiner* — Chan S Park
*Assistant Examiner* — Mark Roz
(74) *Attorney, Agent, or Firm* — Price Heneveld LLP; Scott P. Ryan

(57) ABSTRACT

Algorithms for improving the quality of images tone mapped using the bilateral filter are presented. The algorithms involve a localized operator applied to the tone mapping compression factor which enhances apparent image contrast in the low dynamic range output of the tone mapping. At least one embodiment of the present invention is related to circuitry configured to perform at least a portion of related calculations.

11 Claims, 19 Drawing Sheets
(2 of 19 Drawing Sheet(s) Filed in Color)

(56) References Cited

U.S. PATENT DOCUMENTS

| | | | |
|---|---|---|---|
| 2003/0185439 A1* | 10/2003 | Malvar | 382/166 |
| 2005/0089239 A1* | 4/2005 | Brajovic | 382/266 |
| 2007/0279500 A1* | 12/2007 | Castorina et al. | 348/254 |
| 2008/0192819 A1 | 8/2008 | Ward et al. | |
| 2010/0177203 A1 | 7/2010 | Lin | |

OTHER PUBLICATIONS

Patent Cooperation Treaty, Notification Concerning Transmittal of International Preliminary Report on Patentability, Aug. 11, 2011, 9 pages.

* cited by examiner $Bmin = 0.4$    $Bmax = 7.1$    $Brange = Bmax - Bmin$    $CF(BASE, c) = 10^{[BASE \cdot (c-1)]}$ $$bFactor(BASE, \varepsilon) = \frac{(BASE - Bmin + \varepsilon)}{1 + \frac{(Brange + \varepsilon)}{BASE - Bmin + \varepsilon}} = \frac{(BASE - Bmin + \varepsilon)^2}{BASE - Bmin + 2\varepsilon + Brange}$$

$$bScale(c, \varepsilon) = \frac{1}{bFactor(Bmax, \varepsilon) \cdot CF(Bmax, c) \cdot 10^{Bmax}}$$

$$b(BASE, c, \varepsilon) = bScale(c, \varepsilon) \cdot bFactor(BASE, \varepsilon)$$

$$Ys\_bl\_norm(Y, BASE, c) = \frac{CF(BASE, c) \cdot Y}{10^{Bmax \cdot c}}$$

$$Ys\_bl\_mod\_norm(Y, BASE, c, \varepsilon) = b(BASE, c, \varepsilon) \cdot CF(log(BASE), c) \cdot Y$$

$$Yns\_bl\_norm(Y, c) = \frac{CF(log(Y), c) \cdot Y}{10^{Bmax \cdot c}}$$

$$Yns\_bl\_mod\_norm(Y, c, \varepsilon) = b(log(Y), c, \varepsilon) \cdot CF(log(Y), c) \cdot Y$$

$Ymin = 10^{0.4} = 2.512$    $Ymax = 10^{7.1} = 1.259 \times 10^7$    $\frac{Ymax}{Ymin} = 5.012 \times 10^6$

Fig. 8

$$cf(x,a,b) = \frac{(x - Bmin + a)^2}{(x - Bmin + b)^2} \quad 1001$$

$$CF_f(BASE,c,a,b) = \frac{cf(BASE,a,b) \cdot CF(BASE,c)}{(cf(Bmax,a,b)) \cdot (CF(Bmax,c)) \cdot 10^{Bmax}} \quad 1002$$

$$cg(x,a,b) = \frac{(x - Bmin + a)^2}{(x - Bmin + b)} \quad 1003$$

$$CF_g(BASE,c,a,b) = \frac{cg(BASE,a,b) \cdot CF(BASE,c)}{(cg(Bmax,a,b)) \cdot (CF(Bmax,c)) \cdot 10^{Bmax}} \quad 1004$$

$$ch(x,a) = (x - Bmin + a)^2 \quad 1005$$

$$CF_h(BASE,c,a) = \frac{ch(BASE,a) \cdot CF(BASE,c)}{(ch(Bmax,a)) \cdot (CF(Bmax,c)) \cdot 10^{Bmax}} \quad 1006$$

| | 1318 | 1317 | 1316 | 1315 | 1314 | 1313 | 1312 |
|---|---|---|---|---|---|---|---|
| 1301 | 9 06 | 8b 05 | 7b 04 | 6 03 | 7a 02 | 8a 01 | 9 00 |
| 1302 | 8a 16 | 5 15 | 4b 14 | 3 13 | 4a 12 | 5 11 | 8b 10 |
| 1303 | 7a 26 | 4a 25 | 2 24 | 1 23 | 2 22 | 4b 21 | 7b 20 |
| 1304 | 6 36 | 3 35 | 1 34 | 0 33 | 1 32 | 3 31 | 6 30 |
| 1305 | 7b 46 | 4b 45 | 2 44 | 1 43 | 2 42 | 4a 41 | 7a 40 |
| 1306 | 8b 56 | 5 55 | 4a 54 | 3 53 | 4b 52 | 5 51 | 8a 50 |
| 1307 | 9 66 | 8a 65 | 7a 64 | 6 63 | 7b 62 | 8b 61 | 9 60 |

Fig. 14

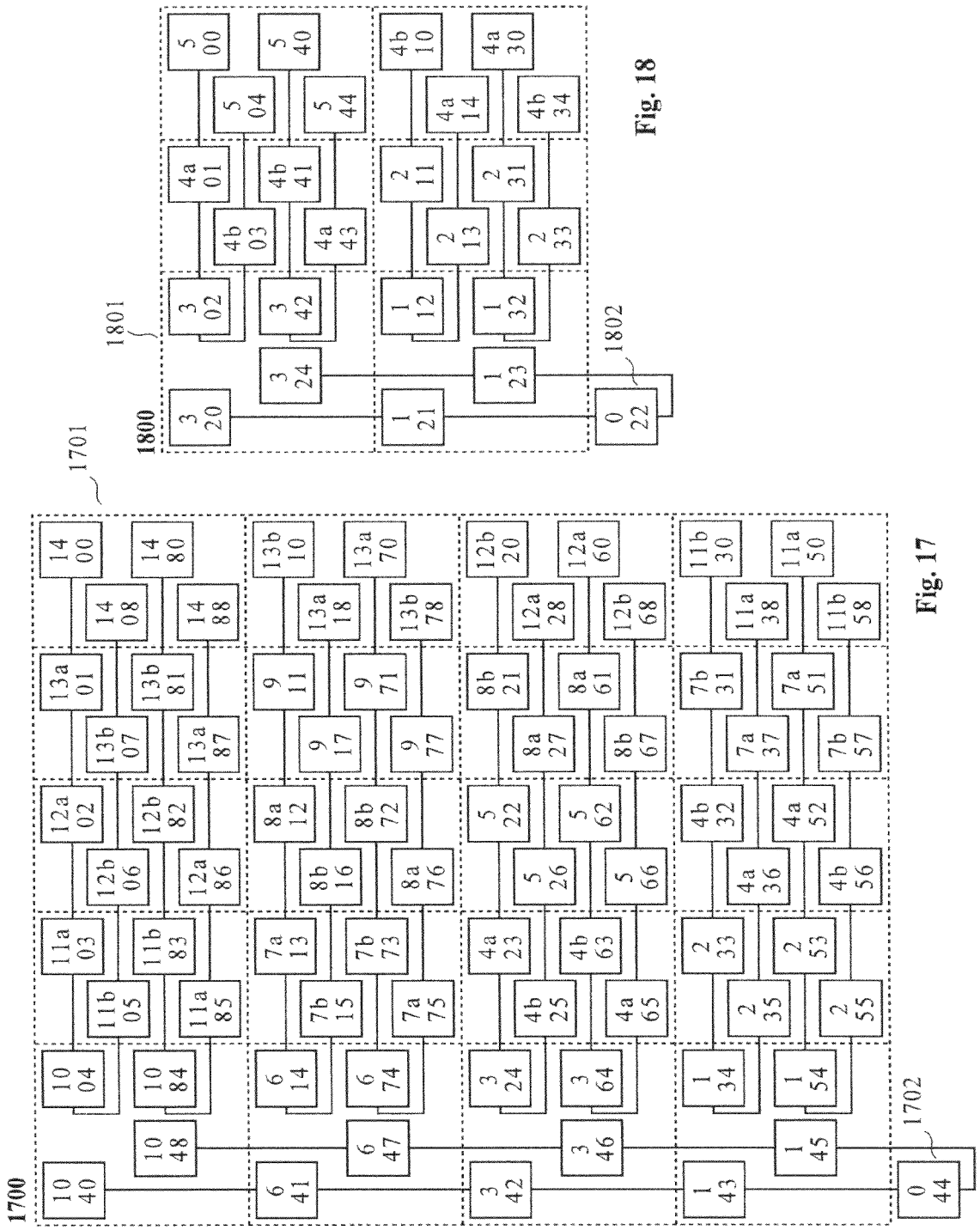

DIGITAL IMAGE PROCESSING AND SYSTEMS INCORPORATING THE SAME

CROSS REFERENCE TO RELATED APPLICATIONS

This application claims priority of U.S. Provisional Patent Application Ser. Nos. 61/149,049, filed Feb. 2, 2009; 61/155,691, filed Feb. 26, 2009; 61/181,770, filed May 28, 2009; and 61/222,532, filed Jul. 2, 2009, under 35 U.S.C. 119(e); the entire content of each is incorporated herein by reference.

INTRODUCTION

It has become desirable to obtain a series of high dynamic range digital images from high dynamic range digital sources, convert said series of high dynamic range digital images to a second series of digital images having a lower dynamic range and display the series of digital images having a lower dynamic range on a display.

Commonly assigned U.S. Provisional Patent Application Ser. No. 60/900,588, Ser. No. 60/902,728 and Ser. No. 61/008,762; U.S. patent application Ser. No. 11/999,623, filed Dec. 6, 2007, Ser. No. 12/082,215, filed Apr. 9, 2008, Ser. No. 12/150,234, filed Apr. 25, 2008, and Ser. No. 12/157,476, filed Jun. 11, 2008; and Taiwanese Patent Application No. 97103404, filed Jan. 30, 2008 describe high dynamic range sources for use with the present invention. The disclosures of each of the above are incorporated in their entireties herein by reference.

Commonly assigned U.S. Provisional Application No. 60/780,655 filed on Mar. 9, 2006; U.S. Provisional Application No. 60/804,351 filed on Jun. 9, 2006; U.S. Patent Application Publication Number 2008/0068520, filed on Mar. 9, 2007; U.S. patent application Ser. No. 12/193,426, filed on Aug. 18, 2008; U.S. patent application Ser. No. 12/570,585, filed Sep. 30, 2009; and U.S. Provisional Patent Application Ser. No. 61/286,452, filed Dec. 15, 2009 describe various displays for use with the present invention. The entire disclosures of each of these applications are incorporated herein by reference.

It should be understood that a source for high dynamic range digital images may be synthetic in nature; a high dynamic range digital image may be synthesized from a series of images of a give scene acquired with varying exposures. It also should be understood that any commercially available display may be incorporated. In at least one embodiment, a high dynamic range digital image having 5,000,000-to-1 dynamic range is received and a second digital image is produced having a dynamic range of 256-to-1.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 8 depicts equations employed in algorithms of at least one embodiment of the present invention;

FIG. 10 depicts three rational expressions for a factor in a modified tone mapping expression;

FIG. 13 depicts an array of pixel values that are used to calculate a bilateral filter value;

FIGS. 14 and 15 depict steps illustrating the layout of a pixel array;

FIG. 17 depicts a 9×9 kernel;

FIG. 18 depicts a 5×5 kernel;

DETAIL DESCRIPTION

Figure 1:
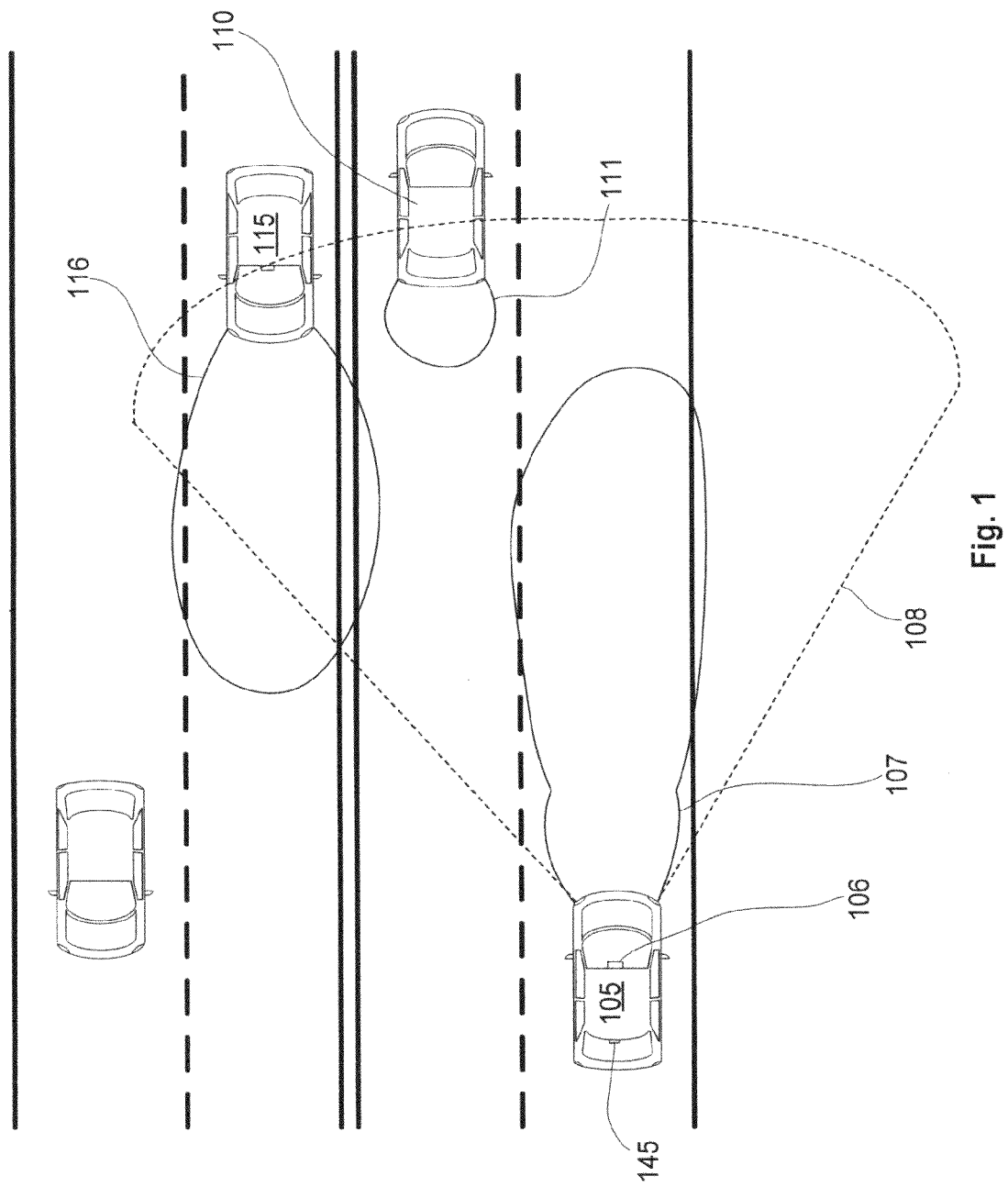
FIG. 1 depicts a plan view of a controlled vehicle proximate other vehicles on a roadway.

Referring initially to FIG. 1, for illustrative purposes, an automatic vehicle equipment control system 106 is shown to be installed within a controlled vehicle 105. Although the control system 106 is depicted to be integral with the interior rearview mirror assembly, it should be understood that the control system, or any of the individual components thereof, may be mounted in any suitable location within the interior, or on the exterior, of the controlled vehicle 105. The term "controlled vehicle" is used herein with reference to a vehicle comprising an automatic vehicle exterior light control system. Suitable locations for mounting the associated image sensor are those locations that provide an unobstructed view of the scene generally forward of the controlled vehicle 105 and allow for detection of headlights 116 of oncoming vehicles 115 and taillights 111 of leading vehicles 110 within the glare zone 108 associated with the controlled vehicle.

Figure 2:
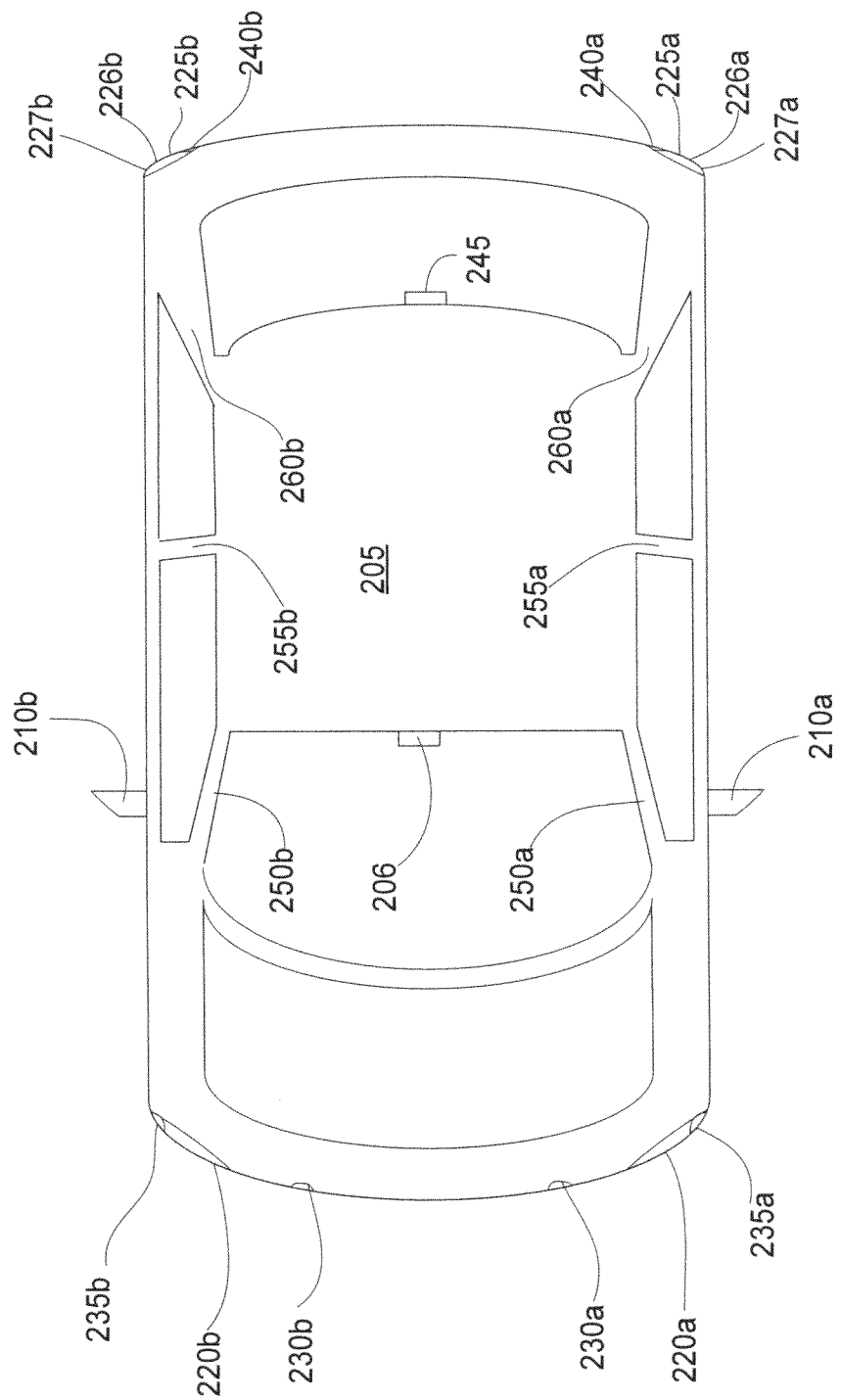
FIG. 2 depicts a plan view of a controlled vehicle having various systems.

FIG. 2 depicts a controlled vehicle 205 comprising an interior rearview mirror assembly 206 incorporating an automatic vehicle exterior light control system. The processing and control system functions to send configuration data to the imager, receive image data from the imager, to process the images and to generate exterior light control signals. Detailed descriptions of such automatic vehicle exterior light control systems are contained in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316 and U.S. patent application Ser. Nos. 10/208,142, 09/799,310, 60/404,879, 60/394,583, 10/235, 476, 10/783,431, 10/777,468 and 09/800,460; the disclosures of which are incorporated herein in their entireties by reference. The controlled vehicle is also depicted to include a driver's side outside rearview mirror assembly 210a, a passenger's side outside rearview mirror assembly 210b, a center high mounted stop light (CHMSL) 245, A-pillars 250a, 250b, B-pillars 255a, 255b and C-pillars 260a, 260b; it should be understood that any of these locations may provide alternate locations for an image sensor, image sensors or related processing and, or, control components. It should be understood that any, or all, of the rearview mirrors may be automatic dimming electro-optic mirrors. The controlled vehicle is depicted to include a host of exterior lights including headlights 220a, 220b, foil weather lights 230a, 230b, front turn indicator/hazard lights 235a, 235b, tail lights 225a, 225b, rear turn indicator lights 226a, 226b, rear hazard lights 227a, 227b and backup lights 240a, 240b. It should be understood that additional exterior lights may be provided, such as, separate low beam and high beam headlights, integrated lights that comprise multipurpose lighting, etc. It should also be understood that any of the exterior lights may be provided with positioners (not shown) to adjust the associated primary optical axis of the given exterior light. It should be understood that the controlled vehicle of FIG. 2 is generally for illustrative purposes and that suitable automatic vehicle exterior light control systems, such as those disclosed in the patents and patent applications incorporated herein by reference, may be employed along with other features described herein and within disclosures incorporated herein by reference.

In at least one embodiment, a plurality of imaging devices are incorporated in a vehicle vision system along with at least one display configured to provide the driver with a "bird's eye" view of the area surrounding the controlled vehicle. For example, a first imaging device is integrated into an interior rearview mirror assembly viewing generally forward of the controlled vehicle, a second imaging device is integrated into a CHMSL assembly viewing generally rearward of the controlled vehicle, a third imaging device is mounted proximate the driver's side of the controlled vehicle and a fourth imaging device is mounted proximate the passenger's side of the controlled vehicle. In at least one related embodiment, a digital image processing algorithm is implemented to synthetically "stitch" the individual images into one contiguous image for display to the driver. Any given imaging device, combination of imaging devices or sub-combination of imaging devices may then be employed for additional automatic control/warning tasks, such as; automatic high-beam assist, lane departure, accident reconstruction, collision avoidance, tunnel detection, pedestrian detection, sign recognition, fog light control, etc.

Figure 3A:
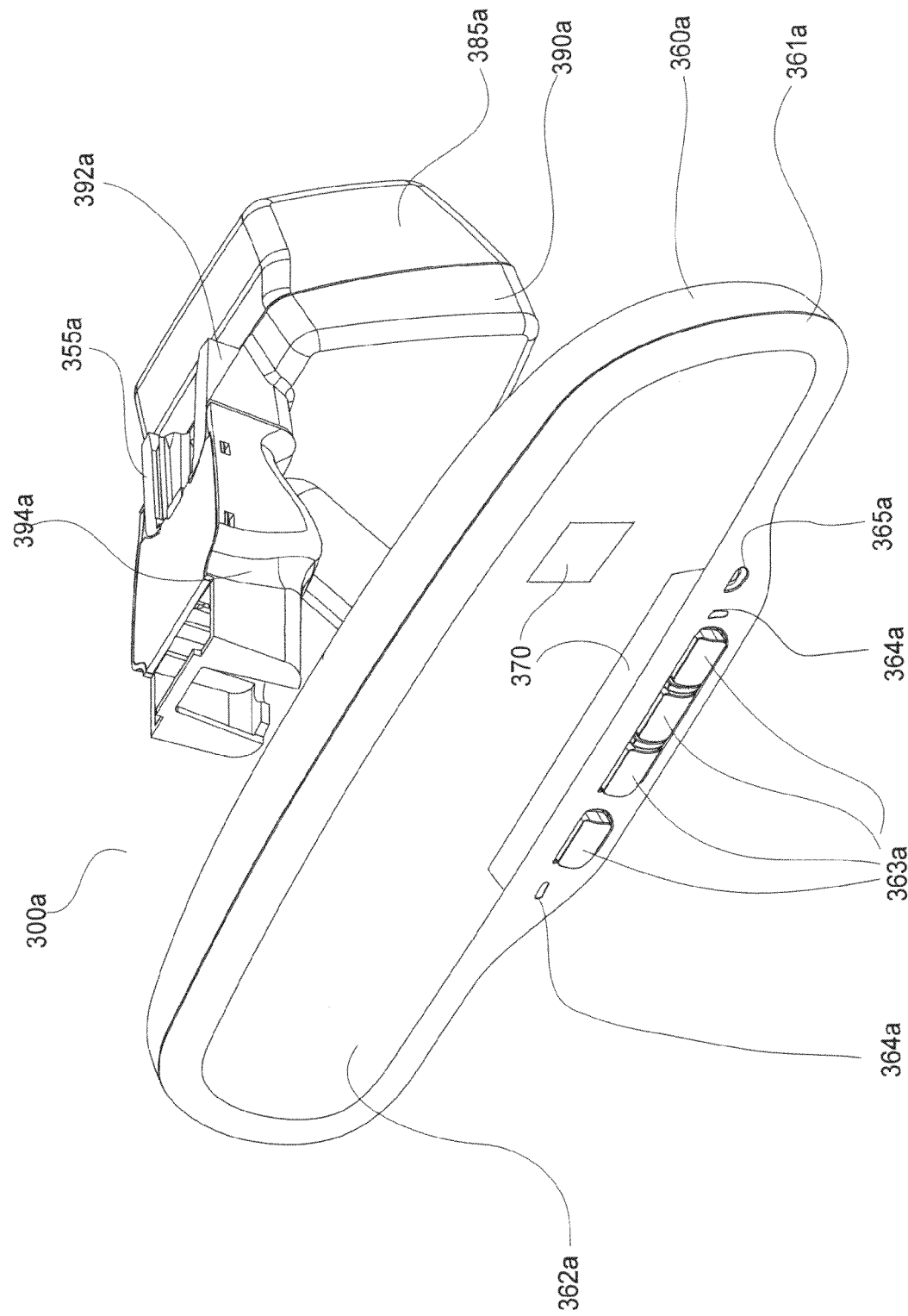
FIGS. 3a and 3b depict perspective views of a rearview assembly for a controlled vehicle.
Figure 3B:
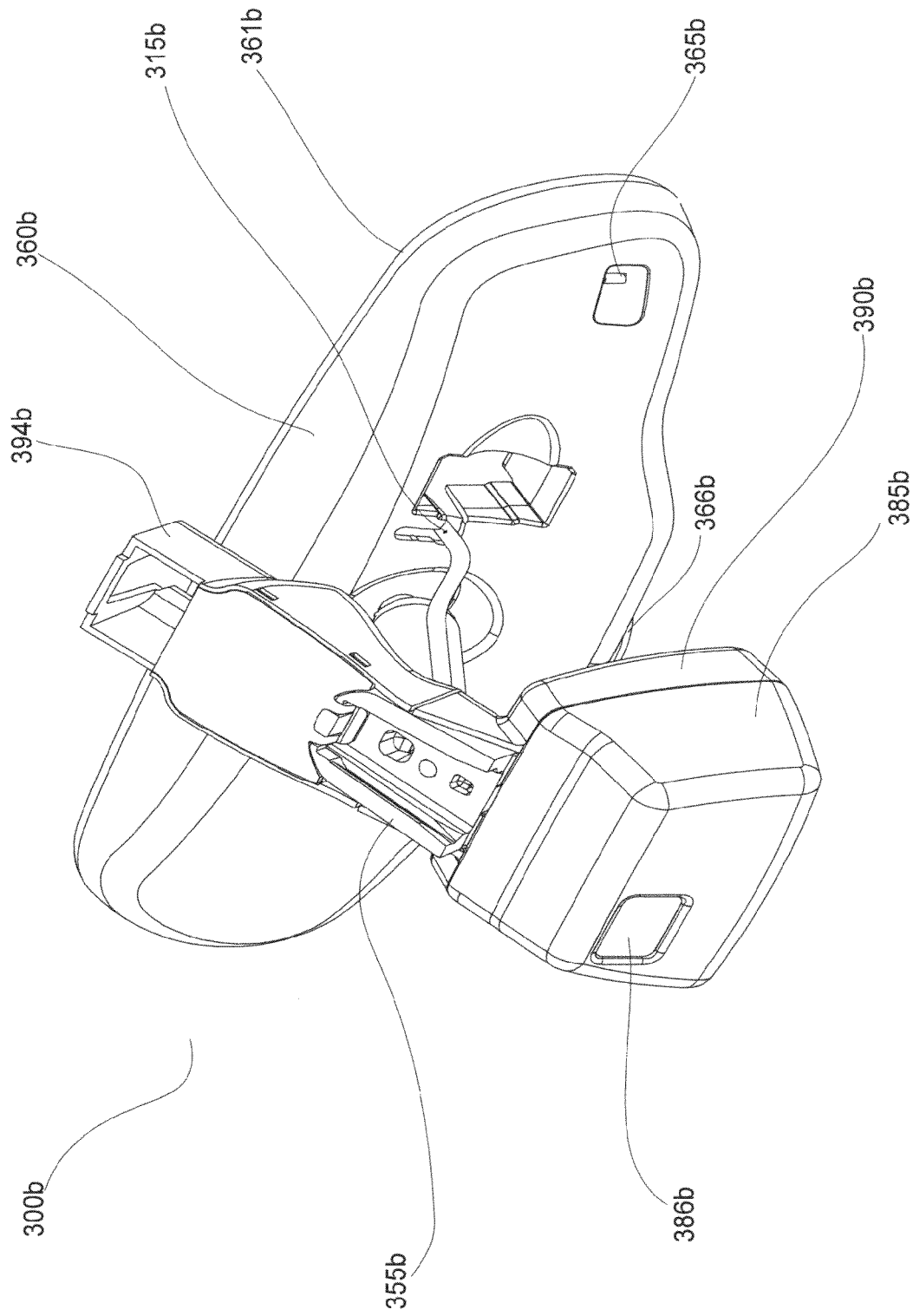

Turning now to FIGS. 3a and 3b, an embodiment of an interior rearview mirror assembly 300a, 300b is shown. The mirror assembly includes a stationary accessory assembly enclosed within a front housing 385a, 385b and a rear housing 390a, 390b. The front housing comprises an aperture 386b defining an image sensor visual opening. The stationary accessory assembly along with a rearview mirror is carried by an attachment member 355a, 355b. The rearview mirror comprises a mirror housing 360a, 360b, a bezel 361a, 361b and a mirror element 362a. A wire cover 394a, 394b is included to conceal related wiring 315b. The rearview mirror assembly 300a, 300b also incorporates an ambient light sensor 365b, at least one microphone 366b, a glare light sensor 365a, operator interfaces 363a, indicators 364a and at least one information display 370.

Figure 4:
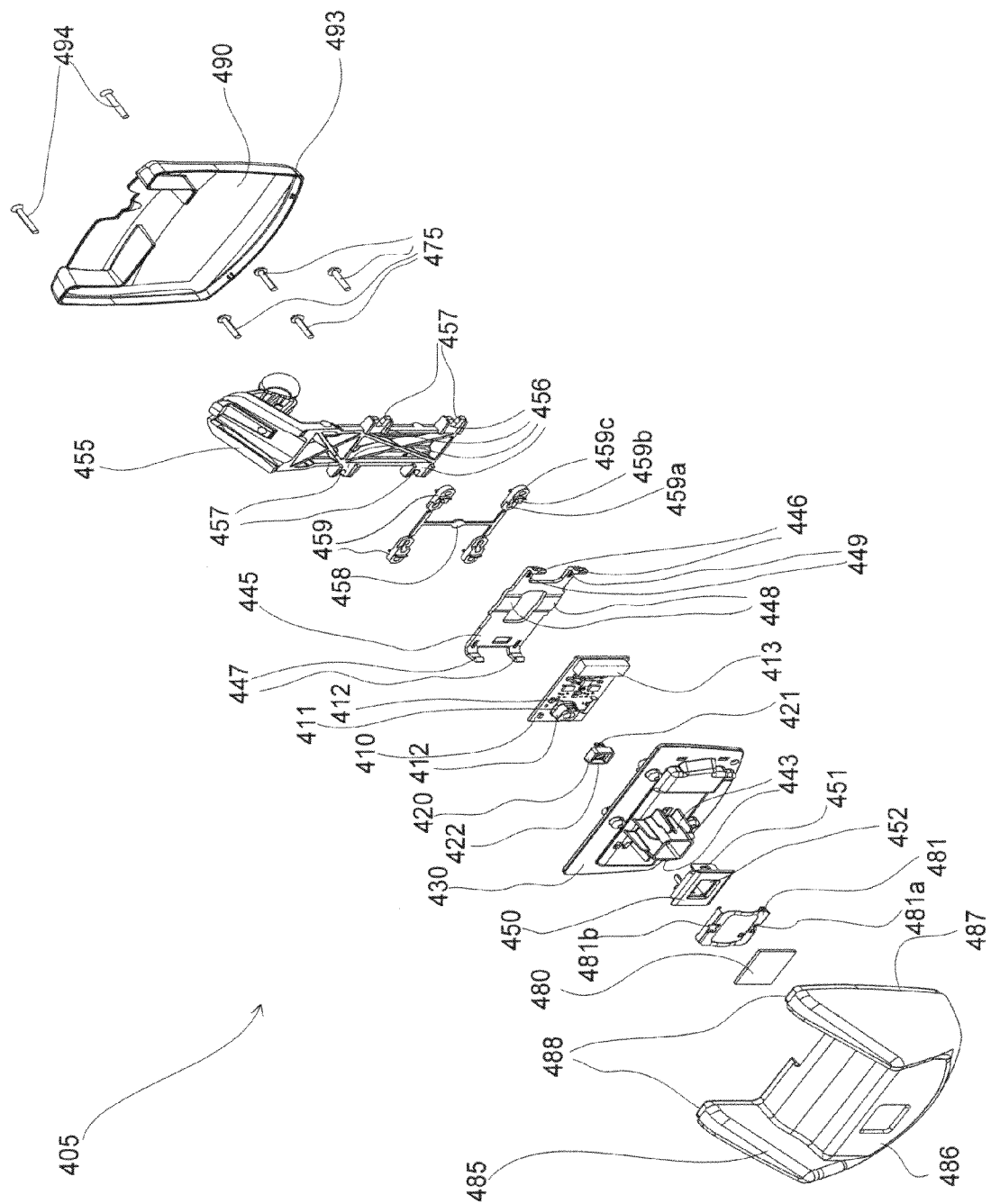
FIG. 4 depicts an exploded, perspective, view of a controlled vehicle accessory module.

Turning now to FIG. 4, there is shown an exploded, perspective, view of an accessory and rearview mirror mount assembly 405. In a preferred embodiment, the accessory and rearview mirror mount assembly provides a rigid structure for mounting a repositionably mounted interior rearview mirror along with a precisely aligned image sensor either stationarily mounted as described in more detail within commonly assigned U.S. patent application Ser. No. 10/783,273 (7606) or automatically repositioning as described in commonly assigned U.S. patent application Ser. No. 10/645,801, both of which are hereby incorporated in their entireties herein by reference. A preferred accessory and rearview mirror mount assembly facilitates ease of assembly as well as provides for repeatable, reliable and precise alignment of the related components. In at least one embodiment, the associated imager is used for automatic exterior vehicle light control for which precision alignment of the image sensor is preferred. It should be understood that the present invention has broad application to light sensing optics generally, in addition to, automotive and consumer electronics applications.

Imager board 410 is provided with an image sensor with lens 411. In a preferred embodiment, the imager board will also include an image sensor control logic and timing circuit, communication line drivers and wire harness receptacle 413. Optionally, the imager board may comprise a processor for receiving and, at least partially, processing images obtained from the image sensor. In a preferred embodiment, the image sensor and at least one other device selected from the group comprising; 1) an image sensor control logic; 2) an A/D converter; 3) a low voltage differential signal line driver; 4) a temperature sensor; 5) a control output; 6) a voltage regulator; 7) a second image sensor; 8) a microprocessor; 9) a moisture sensor and 10) a compass are integrated in a common ASIC, most preferably on a common silicon wafer. In at least one embodiment, the image sensor with lens 911 includes lens cover snap portions 412 for engaging a lens cover 420 snap clips 421. The lens cover has an aperture 422 for alignment with the optical axis of the image sensor and lens. Various suitable optical systems, such as those depicted and described in commonly assigned U.S. Pat. Nos. 5,990,469; 6,008,486; 6,130,421; 6,130,448; 6,049,171; and 6,403,942 and U.S. Patent Application Ser. No. 60/495,906 (2880); the disclosures of which are incorporated herein in their entireties by reference; may be employed. It should be understood that optics in accordance with the present invention may obviate the need for a lens cover 420 as described in detail herein. It should be understood that the lens cover snap portions, the lens optical cover and snap clips may be eliminated with use of optical elements in accordance with the present invention. In at least one embodiment, the "lens cover" is formed on a molded organic material optics element using a laser as described in detail herein.

An imager board wiring harness (not shown) is preferably provided with plugs on either end thereof. The imager board is preferably provided with a male receptacle 413 for receiving one of the plugs of the imager board wiring harness (not shown).

Figure 5:
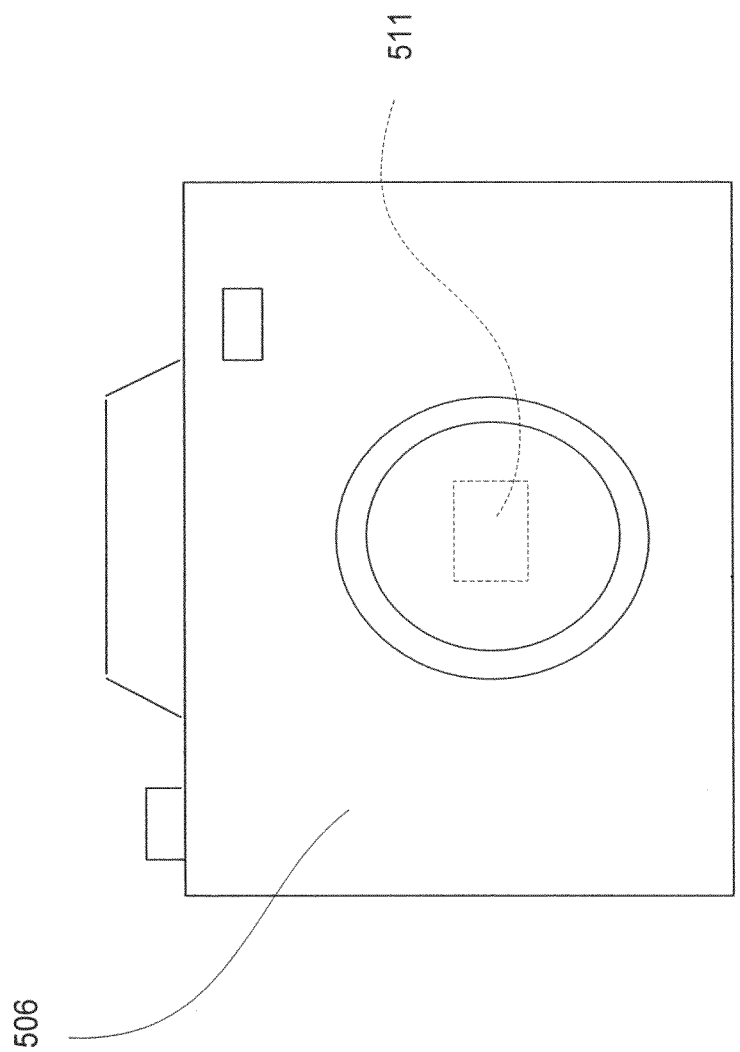
FIG. 5 depicts a profile view of a digital camera.

FIG. 5 depicts a profile view of a digital camera 506 in accordance with the present invention having an imager with lens 511. It should be understood that optics in accordance with the present invention may be incorporated into a host of assemblies included, but not limited to, light sensing, image acquisition, moisture sensing, rear-vision systems, lane departure detection systems, adaptive cruise control systems, occupancy detection systems, security systems, vision systems, color measurement systems, head lamp control systems, variable reflectance rearview mirror control systems, digital video recorders and digital cameras.

Operations and algorithms which map high dynamic range sources onto low dynamic range output displays, or tone mapping operators, have become an important part of a modern digital image processing work flow and will become even more important as high dynamic range imaging sources become more readily available. Tone mapping operators can be divided into two main categories, global operators which use a single transform for every pixel, and local operators which separately transform groups of spatially proximate pixels. In general, global operators are simple to implement, but tend to wash-out image detail or distort local contrast throughout the image. Local operators have the ability to preserve image detail (high spatial frequencies) throughout the range of input intensities at the cost of higher algorithmic complexity. The tone mapping operator proposed by Durand and Dorsey is based on the bilateral filter which is a local operator. In contrast to many existing local operators (Fattal, et al; Mantiuk, et al; Ledda et al.) the bilateral filter is straightforward to implement, does not require image decomposition into multiple layers or scales (thus requiring multiple copies of the image in memory), and works consistently across a wide variety of input images with only minor adjustments to the operator parameters. The bilateral tone mapping process based on the bilateral filter also treats image noise in an even-handed way (i.e., there is no specific noise reduction provision, but there is also no noise enhancement across the entire input space). While Durand and Dorsey's tone mapping operator elegantly reduces the entire input dynamic range into an arbitrary output dynamic range, it unfortunately tends to under-utilize the output dynamic range. Extremely low luminance input values get mapped into mid-scale output luminance values due to the exponential nature of the compression. This exponential mapping results in "flat" images which, while completely mapping input luminance and detail to the output space, lack photographic and visual appeal. This result has been confirmed by a recent study done at the University of Bristol, "Evaluation of Tone Mapping Operators using a High Dynamic Range Display," Ledda et al. ACM Transactions on Graphics, Volume 24 Issue 3, July 2005, where several tone mapping operators were compared over a set of images. The bilateral tone mapping operator was consistently ranked much lower than several more sophisticated and complex tone mapping algorithms.

The proposed modifications to the bilateral tone mapping operator enhance the apparent contrast of the resulting low dynamic range output by better utilizing the entire output dynamic range. A method to automatically adjust the tone mapping operator input parameters in order to optimize the visual and photographic appeal of the still image or image stream (video) output is also presented. Better utilization of the output dynamic range is accomplished by applying a proposed new local operator to the compression factor generated by the Durand/Dorsey tone mapping operator. This proposed local operator can optionally take advantage of the noise reduction properties of the bilateral filter while preserving as much image information as possible in the low dynamic range output by only operating on the compression factor.

The bilateral tone mapping process, as proposed by Durand and Dorsey, can be summarized as follows:

$$BASE = bilateral(\log_{10} Y, \sigma_S, \sigma_I)$$

$$DETAIL = \log_{10} Y - BASE$$

$$L = BASE \cdot c + DETAIL$$

$$CF = \frac{10^L}{Y}$$

where
Y=input pixel luminance
$\sigma_S$=spatial filter support
$\sigma_I$=intensity (log-luminance) filter support
c=compression ratio
CF=compression factor (pixel multiplier)

An input image is first separated into luminance and color channels. The tone mapping process then uses the $\log_{10}$ of the luminance channel, Y, as the input to a bilateral filter. The output of the bilateral filter is labeled the BASE layer, and is then used to compute a DETAIL layer. A compression factor, CF, is calculated by reducing the contrast of the BASE layer by some input compression ratio c, adding the DETAIL layer to the reduced contrast BASE layer, and then exponentiating and scaling by the original input luminance. The compression factor, CF, is multiplied against the R, G and B color channels of the input image (or just the luminance channel of a grayscale image) to produce the tone mapped, low dynamic range output image. From this formulation, two key aspects of the bilateral tone mapping operator are apparent: the operator is indifferent to input noise, and the calculated compression factor, CF, is an exponential function which tends to reduce and shift the output range into which low luminance input values (shadows, dark areas) are mapped.

The DETAIL layer, generated by subtracting the bilateral filter output from the log-luminance channel, necessarily contains all of the high-frequency noise components present in the input image. This layer is directly added to the final compression factor which effectively retains all of the noise of the input image in the output (the compression ratio, c, is used only to compress the BASE layer). In this way the Durand/Dorsey tone mapping operator passes substantially all of the noise in the input image through to the output image without leveraging the noise reduction properties of the bilateral filter.

In order to more clearly see the mechanism by which the bilateral tone mapping operator misrepresents shadowed or dark regions of an image, it is useful to reformulate the equation for the compression factor, CF, as follows:

$$CF = (10^{(BASE \cdot c + DETAIL)})/Y$$
$$= (10^{(BASE \cdot c + \log_{10} Y - BASE)})/Y$$
$$= (10^{(BASE \cdot (c-1) + \log_{10} Y)})/Y$$
$$= 10^{(BASE \cdot (c-1))}$$

The original luminance, Y, drops out of the equation and the simple exponential compression factor (similar to a gamma correction) becomes apparent. The value of the input compression ratio, c, is intended to be between 0 and 1 which creates an inverse relationship and quickly maps input shadows into output mid-range values forcing the output image values into a range smaller than the actual output space. There is no provision in the original tone mapping formulation for adjustment of the image black-point (artificial mapping of an intensity level within the image to a zero intensity value), and thus images output from the Durand/Dorsey tone mapping algorithm generally lack shadowed regions, or regions with a very low average luminance value. While cleverly preserving contrast ratios across many orders of magnitude, the lack of low luminance values in output images leads to lackluster visual appeal and "flat" images.

The current invention builds on the bilateral tone mapping operator, adding an additional local operator to the contrast compression factor which intentionally re-shapes the compression. The addition of this component better utilizes the output data space while simultaneously increasing apparent contrast and photographic appeal of the output image. This operator is preferably based on the output of the bilateral filter and applied directly to the compression factor, CF, thus not only enhancing the visual appeal of the output image, but also leveraging the edge-preserving noise reduction inherent to the bilateral filter. Applying this operator directly to the compression factor has the added benefit of altering the compression before it has been applied to the original image. This ensures that a maximal amount of usable data will be retained in the output image for possible post-processing operations.

An exemplary operator that has the re-shaping characteristics just described can be formulated as a rational expression using the output of the bilateral filter as follows:

$$CF_e = CF \cdot \left( \frac{\epsilon + (BASE - B_{min})}{1 + \frac{\epsilon + B_{range}}{\epsilon + (BASE - B_{min})}} \right) \cdot \frac{2}{\epsilon + B_{range}}$$

where
    CF=Durand/Dorsey compression factor
    $B_{max}$=max (bilateral($\log_{10}$ Y, $\sigma_S$, $\sigma_I$))
    $B_{min}$=min (bilateral($\log_{10}$ Y, $\sigma_S$, $\sigma_I$))
    $B_{range}$=$B_{max}$-$B_{min}$
    $\epsilon$=black-point adjustment parameter This particular formulation modulates the Durand/Dorsey compression factor, CF, in a manner similar to the local dodging and burning operator used by Reinhard, et al., in their paper, "Photographic Tone Reproduction for Digital Images," ACM Transactions on Graphics, 2002. At low input intensity values, the exemplary rational expression, involving BASE, divides the original compression factor by approximately the square of $B_{range}$. As input intensity values increase, the rational expression smoothly transitions to a factor of approximately 1 thereby stretching (lowering) the compression only for low input intensities. The epsilon input parameter allows the equation to be tuned to any arbitrary input space, and also provides a method of control over the resulting image black point by adjusting the point at which the rational expression transitions to a factor of approximately 1. Using this new compression factor, $CF_e$, to compress the R, G, and B input channels has the effect of compressing low luminance values less than they would previously have been compressed while smoothly transitioning to the original exponential compression factor for high luminance values. The use of the BASE layer in the exemplary rational expression adds a measure of smoothing to the new compression factor due to the Gaussian nature of the BASE layer formulation. A similar formulation of an exemplary rational expression replacing BASE with log-luminance ($\log_{10}$ Y), $B_{min}$ with min ($\log_{10}$ Y) and $B_{max}$ with max ($\log_{10}$ Y) can perform the same contrast stretching described above, but without introducing additional smoothing or noise reduction in the final output image. Depending on image content, either approach may be desirable.

In order to decrease the sensitivity of this new operator to extremes in the image, the $B_{max}$ and $B_{min}$ parameters can be replaced with percentile values (e.g. 90% and 10%), time-averaged values, statistical or histogram-based values, or a combination of all three. This can be especially useful for compressing streams of images from an HDR source where changing extremes in the image could lead to a visual "flicker" in the overall brightness or appearance of the compressed output.

Additionally, it should be understood that the exemplary operator described above can be replaced with any arbitrary rational expression provided the rational expression modulates the Durand/Dorsey compression factor, CF, in a manner substantially similar to the exemplary operator presented above. For example, hardware implementations of the present invention may desire to avoid division, which is costly in hardware, and thus replace the exemplary rational expression with some other equivalent function more conducive to hardware implementation.

Figure 6:
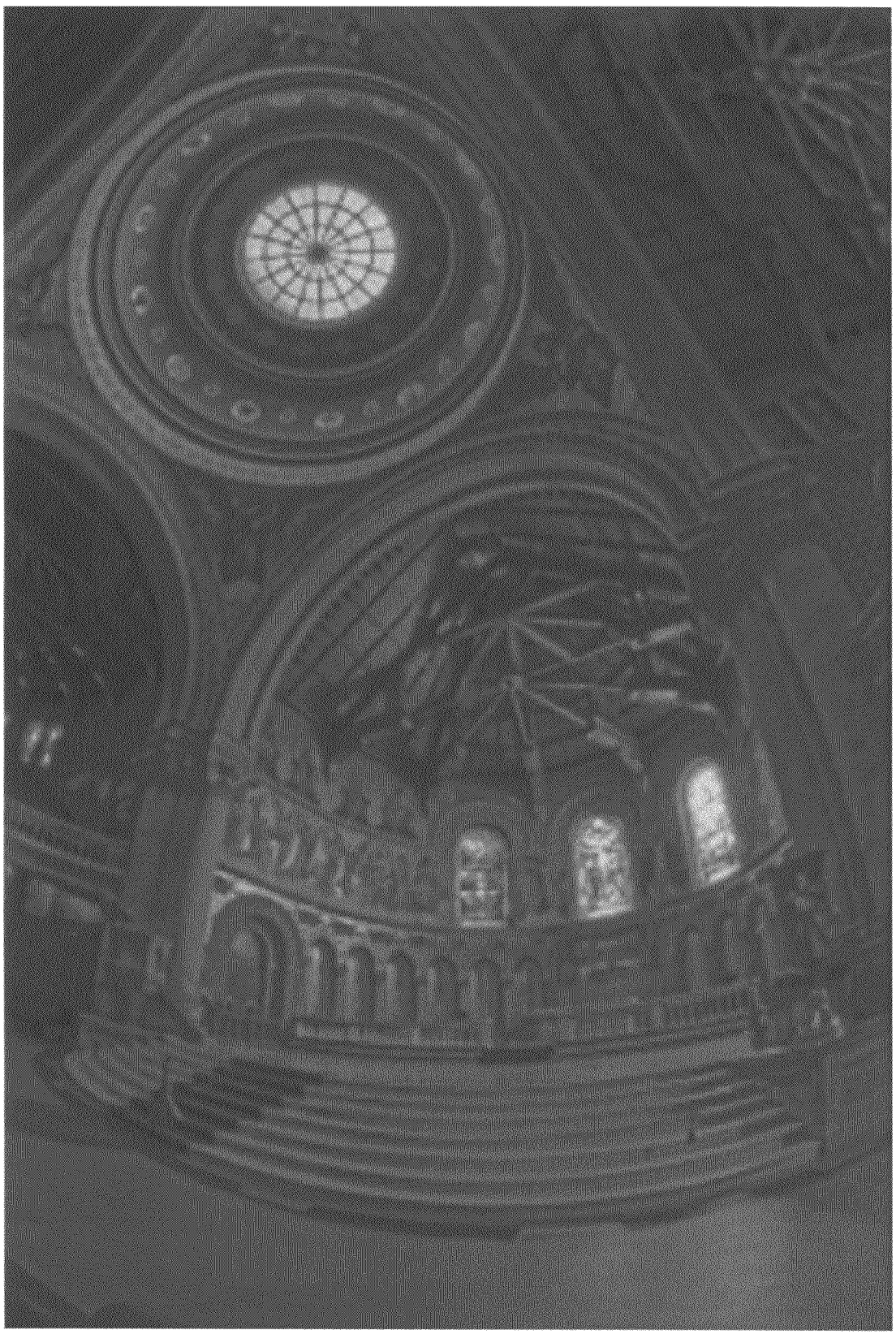
FIG. 6 depicts a digital image compressed using a Durand and Dorsey bilateral tone mapping operator.
Figure 7:
FIG. 7 depicts a digital image compressed using the tone mapping algorithm of the present invention.

For comparison, two tone mapped images are presented in FIGS. 6 and 7. The scene in both is of the Stanford memorial chapel and has been used extensively as a tone mapping benchmark. The image depicted in FIG. 6 has been compressed using Durand and Dorsey's bilateral tone mapping operator. The image depicted in FIG. 7 has been compressed with the proposed modifications to the bilateral tone mapping operator. Notice the difference in apparent contrast and the increased visual appeal of the image compressed using the new operator. Most of the increased visual appeal of the output of the proposed operator stems from the addition of low-luminance data to the output image. The exponential compression of the original bilateral tone mapping operator has effectively compressed low luminance values into mid-range luminance values.

In addition to the modified compression technique presented above, the current invention includes a method for automatically determining the compression ratio, c, input parameter to the bilateral tone mapping operator based on key scene parameters derived from either the original input image, the bilateral filter or some other substantially similar image processing technique. The bilateral tone mapping compression ratio, c, is used to scale the BASE layer that was generated by running the bilateral filter over the log-luminance channel of the original image. The current invention provides a mechanism to automatically derive a reasonable value for this ratio, but also provides a new input parameter to optionally adjust the automatic calculation if necessary.

Before defining the method for automatically deriving the compression ratio, it is helpful to draw an analogy between modern digital imaging and Ansel Adams' Zone System [Adams, *The Camera*, 1980; *The Negative*, 1981; *The Print*, 1983]. In the zone system numbers are assigned to different brightness levels (0-10), each brightness level is labeled as a zone and the brightness of each zone differs from its adjacent zones by a factor of 2. The metering and exposure of a scene using the zone system can be done in several different ways— in fact the system is designed to give a systematic method for precisely defining the relationships between the way a scene is perceived and the final print. One method of using the zone system is to choose a key point in the scene that should map to a mid-range luminance value and assign this key to Zone 5. This helps to ensure that as much scene detail, both shadows and highlights, are properly exposed. The absolute luminance of the scene's key element can vary from scene to scene. A scene with a key element that has high luminance value can be said to be a high-key scene. Correspondingly, a scene with a key element that has a low luminance value can be said to be a low-key scene.

To make the analogy to digital photography and the present invention, a high-key scene is subjectively bright and would map to a digital image which has pixel values dominated by high digital values. A low-key scene is subjectively dark and would map to a digital image having pixel values dominated by low luminance values. Historically, this analogy has been imperfect due to traditional digital imaging exposure compensation issues (e.g., a high-key scene can be captured with an exposure time which is too short resulting in mid- to low-range luminance values of the digital pixels), but when dealing with high dynamic range data (especially data generated from a high dynamic range source) the analogy holds fairly well. Using this analogy, the process of choosing a compression ratio becomes analogous to choosing a middle grey mapping in Adams' Zone System. In order to perform this mapping the digital key value of an image needs to be computed.

One simple way to compute an image's digital key value is to take the ratio of the arithmetic average of the bilateral filter output (the BASE layer) to the range of values present in the BASE layer:

$$B_{key} = \frac{B_{avg} - B_{min}}{B_{max} - B_{min}}$$

where
- $B_{key}$=Digital key value
- $B_{avg}$=Average value of BASE layer
- $B_{min}$=Minimum value of BASE layer
- $B_{max}$=Maximum value of BASE layer Because the BASE layer is in the logarithmic domain, the arithmetic average of the BASE layer is equivalent to the geometric mean of the input pixel values. Humans perceive light in a logarithmic manner, thus using the geometric mean of the set of input luminance values to calculate a scene's key value makes intuitive sense. However, because the input high dynamic range image contains a huge range of luminance values, any sort of mean or average is quickly distorted by high intensity regions—even very small ones. This distortion, or weighting, results in digital key values that are skewed towards high-key scenes even when the overall scene may be subjectively much lower-key.

In order to further refine the calculation of the digital key value, and to address the short-comings of the use of an average calculation, the present invention proposes to use histogram statistics to characterize the key of a scene. By analyzing the shape of the histogram, the scene's digital key value can be calculated in a more robust way. The proposed algorithm for calculating the digital key value of an image is as follows: First, calculate an image histogram. This histogram is preferably calculated on the output of the bilateral filter, the BASE layer, in order to take advantage of the noise suppressing characteristics of the filter in the digital key value calculation. The BASE layer values are in log space, and are preferably quantized into a finite number of bins in order to make the histogram calculation tractable.

Next, a histogram minimum bin, $H_{min}$, is calculated by locating the first histogram bin whose count is above some given count threshold, $H_{thresh}$, and whose neighboring bin counts also exceed $H_{thresh}$. A histogram maximum bin, $H_{max}$, is calculated by locating the last bin whose count is greater than $H_{thresh}$, and whose neighboring bin counts also exceed $H_{thresh}$.

Finally, a rolling window of size $N_{win}$ is passed over bins between $H_{min}$ and $H_{max}$ and an arbitrary bin of the window with the largest total bin count is labeled as the histogram peak bin, $H_{peak}$. The histogram bins $H_{min}$, $H_{max}$, and $H_{peak}$ are then referred back to their corresponding BASE layer values (or other image-referred values on which the histogram was calculated) to generate $B_{hmin}$, $B_{hmax}$ and $B_{hpeak}$. These values are then used in place of $B_{min}$, $B_{max}$ and $B_{avg}$ to compute the digital key value.

$$B_{key} = \frac{B_{hpeak} - B_{hmin}}{B_{hmax} - B_{hmin}}$$

where
- $B_{key}$=Digital key value
- $B_{hmin}$=Histogram minimum value
- $B_{hmax}$=Histogram maximum value
- $B_{hpeak}$=Histogram peak value between $B_{hmin}$ and $B_{hmax}$ This histogram method of calculating the digital key value rejects outlier pixels and outlier image content (which can be defined as luminance values which do not affect the key of a scene, are substantially disparate from the bulk of the histogram, and whose luminance values do not spread over more than two histogram bins). Rejection of these types of image content is critical in calculating a digital key value which corresponds to Ansel Adams' key value, and which corresponds to a more intuitively appropriate key value. The $H_{thresh}$ value can be used to adjust these rejection characteristics.

Once calculated, the digital key value is then used to automatically adjust the compression ratio, c, in a manner substantially similar to the following:

$$c = \frac{c_{min} + (1 - B_{key}) \cdot (c_{max} - c_{min})}{brightness}$$

where
- c=calculated compression ratio
- $c_{max}$=The maximum desired compression ratio
- $c_{min}$=The minimum desired compression ratio
- brightness=parameter to control output brightness The compression ratio calculated for image scenes with a low-key value will approach the maximum compression ratio, $c_{max}$, which will result in a compression factor, CF, calculation which maximizes the (c−1) term (as it approaches 0) and thus compresses the image less. Similarly, the compression ratio calculated for image scenes with a high-key value will approach the minimum compression ratio, which will result in a compression factor, CF, calculation which minimizes the (c−1) term (as it diverges from 0) and thus compresses the image more.

As in the proposed formulation of the new compression factor, the values extracted from the image to calculate the digital key value can be replaced with time averaged values to smoothly transition between extremes in subsequent frames of a high dynamic range image stream. Without time averaging of digital key value input parameters, the digital key value calculation could potentially change dramatically from image-to-image which would result in an apparent "flicker" of the output low dynamic range images due to the drastically different compression ratios calculated from the digital key value.

The present invention also provides a mechanism for dealing with extremes in input image data that would cause the automatic calculation of the compression ratio, and possibly the modulation of the compression factor, to produce undesirable results. Specifically, when the input image data has a sufficiently low dynamic range the exemplary compression factor rational expression will too quickly transition to a factor of 1 (losing the visual enhancement property of the equation), and the automatic calculation of the compression ratio will become overly sensitive to image noise. Treating low dynamic range input data as a special case and fixing all tone mapping operator parameters for optimal image output simultaneously overcome these problems. It may also be desirable to manipulate the automatic calculation of the compression ratio and the compression factor rational expression to smoothly transition into the low dynamic range input mode.

The automatic generation of a compression ratio, described above, used in combination with the proposed enhancement to the compression factor calculation can provide an incredibly robust and visually appealing method of performing bilateral tone mapping. Deriving most of the key tone mapping operator parameters from the original image, the proposed tone mapping algorithm creates consistent, visually appealing low dynamic range images from wide range of high dynamic (and low dynamic) range input sources.

To better understand the bilateral tone mapping algorithm as proposed by Durand and Dorsey, the algorithm may be separated into two factors. The first factor is a local operator based on the detail layer and directly related to the application of the bilateral filter and the second factor is a global operator that may be expressed as the luminance of the pixel raised to a power. This separation is outlined below and for convenience the first component will be referred to as the original local tone mapping factor and the second as the original global tone mapping factor.

For very uniform areas of an image or for very small values for $\sigma_S$ in combination with very large values for $\sigma_I$, the value BASE which is defined as bilateral ($\log_{10} Y$, $\sigma_S$, $\sigma_I$) approaches $\log_{10} Y$ in value so $$CF_{NS} \cong 10^{\log_{10} Y \cdot (c-1)} = \frac{Y^c}{Y}$$

$CF_{NS}$ denotes a compression factor calculated using the bilateral tone mapping algorithm but without the smoothing effect of the bilateral filter. Multiplication of the pixel value by $CF_{NS}$ results in a new luminance value for the pixel that is approximately equal to $CF_{NS}$ times Y where Y is the original luminance of the pixel. For the special case above, the luminance Y of the pixel before tone mapping cancels the luminance Y in the denominator of the expression for $CF_{NS}$ leaving $Y^c$ as the new pixel luminance after tone mapping. In this expression, c is the compression ratio used for the bilateral tone mapping operation. As an example, for a compression ratio of c equal to 0.5, small contrast ratios are reduced by a factor of c (0.5) and large contrast ratios of 10,000 to 1, for example, are reduced by a far larger factor of 0.01 from the initial ratio of 10,000 to 1 to a resulting ratio of 100 to 1. In general, a contrast ratio of R is reduced to resulting contrast ratio of $R^c$.

For the more general case where the filtering or smoothing effects of BASE are significant:

$$CF = 10^{BASE \cdot (c-1)}$$

Now let $Y_{NS}$ represent the luminance of pixel Y after applying the $CF_{NS}$ compression factor without the smoothing effect and $Y_S$ represent the luminance of the same pixel Y after application of the CF for which smoothing effects are present. Now let:

$$ExpBase = 10^{Base}$$

Then:

$$Y_{NS} \cong Y^c \text{ and } Y_s \cong ExpBase^{(c-1)} \cdot Y$$

Then:

$$\frac{Y_S}{Y_{NS}} \cong \frac{ExpBASE^{(c-1)} \cdot Y}{Y^c} = \left[\frac{ExpBASE}{Y}\right]^{(c-1)}$$

Then rearranging and substituting the value for DETAIL from the tone mapping equations:

$$\frac{Y_S}{Y_{NS}} = \left[\frac{Y}{ExpBASE}\right]^{(1-c)} = 10^{DETAIL \cdot (1-c)}$$

Further, since $Y_S$ and $Y_{NS}$ are obtained by multiplying CF and $CF_{NS}$, respectively, by Y:

$$\frac{CF}{CF_{NS}} = \frac{Y_S}{Y_{NS}}$$

Therefore:

$$CF = 10^{DETAIL \cdot (1-c)} \cdot CF_{NS} = 10^{DETAIL \cdot (1-c)} \cdot \frac{Y^c}{Y}$$

Here the factor $10^{DETAIL \cdot (1-c)}$ is designated as the original local tone mapping factor and factor $Y^c/Y$ is designated as the original global tone mapping factor. The original local tone mapping factor has the advantage that its value may, for example, be computed for a given individual pixel location using arrays of pixel values as small as 5×5 or 7×7 with the given pixel at the center to compute the bilateral filter value, BASE, associated with the given pixel location. This necessitates retaining only 5 to 7 rows of pixels in memory at any given time to provide pixel values required for the computation. Thus when, for example, an image is acquired pixel by pixel for each row and row by row for each frame, only 5 to 7 rows of image data need to be buffered to provide the data for the computation of the BASE value of the bilateral filter associated with each pixel of the image and if the computation is arranged to keep up with the pixel input rate, the image output needs to be delayed by little more than the time required to acquire 5 to 7 rows of image data in order to provide the tone mapped output. This is a very important feature for tone mapping of images for real time display where safety critical decisions or the ability to use visual feedback to control a vehicle or other operation may be needed and additionally the modest buffering requirement reduces memory needed to perform the filter operation.

The original local tone mapping factor has low frequency components removed and serves primarily to enhance contrast in neighboring features of the image which are initially low in contrast and which lack visibility and visual appeal when contrast is not enhanced in the tone mapping operation. The original global tone mapping factor achieves the contrast compression using the pixel luminance raised to a predetermined exponential power. This is very similar to the gamma function used to pre-process images for display and has the advantages of compressing large contrast ratios much more than small ones and operating in a mathematically uniform manner over arbitrarily large ranges in luminance. A further advantage is that simple adjustment of the exponent based on the compression ratio that is needed provides for setting the compression to meet requirements that may range from provision of contrast expansion to provision of extreme contrast compression. In exemplary embodiments in this invention, this adjustment is utilized for its original tone mapping function and further extended to provide the proper amount of compression (or compression ratio) to compensate for the combined effects on the overall compression ratio of the compression or expansion introduced by factors added to modify the tone mapping algorithm along with the provision of compression to map the image from the dynamic range of the input image to the desired dynamic range of the tone mapped image.

Figure 11:
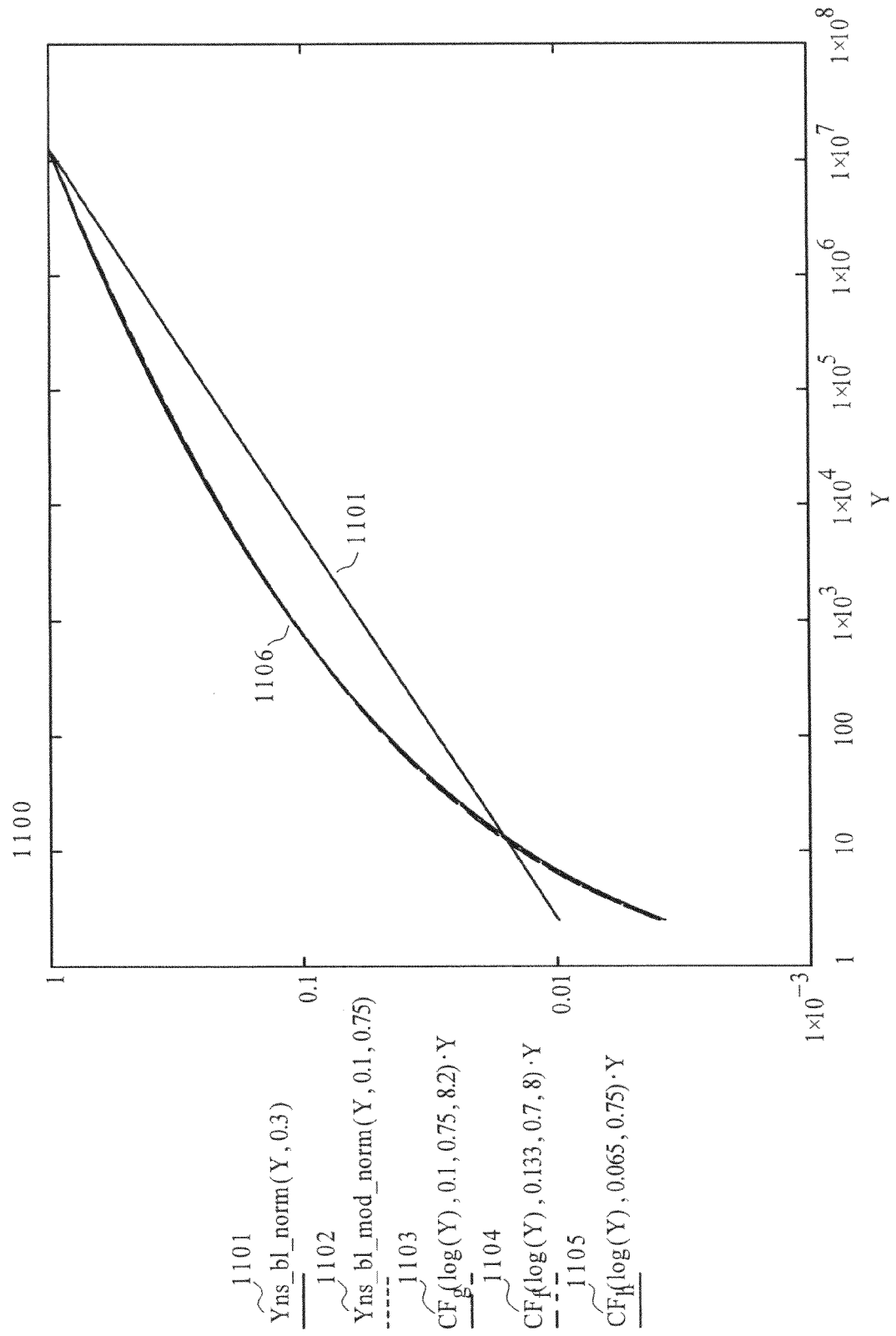
FIG. 11 depicts a graph of five tone mapping operators.

As illustrated in FIG. 11, the original global tone mapping factor appears as a straight line 1101 on the log-log scale used in FIG. 11. The exponent determines the slope of the plot but the line remains straight allowing only flexibility to change its slope or to multiply by a constant scaling factor that shifts its vertical position on the log-log graph in FIG. 11. One or more additional, non-constant terms are needed in the compression factor of the tone mapping algorithm to provide flexibility to shape or characterize the transfer characteristic of the compression factor to provide a more pleasing and intelligible image which makes better use of the dynamic range used to display the tone mapped image. Such flexibility is provided in one example by the addition of bFactor (805 of FIG. 8). bFactor is included as a product term in the compression factor Yns_bl_mod_norm (811 of FIG. 8). The plots in FIG. 11 are of equations listed in FIG. 8. As an approximation, the plots in FIG. 11 are depicted as global tone mapping curves from which averaging or smoothing effects of the bilateral filter have been removed as indicated by the designation ns for no smoothing. Straight line plot 1101 represents the prior art bilateral filter and plots 1102, 1103, 1104 and 1105 depict plots using various parameters in the compression factor Yns_bl_modnorm introduced as an example which incorporates aspects of this invention. The curves in the illustration are generated by addition of non-constant rational factors or product terms to the originally proposed bilateral tone mapping equation that in its normalized form with the smoothing effects of the bilateral filter removed is designated as Yns_bl_mod_norm. These additional factors or product terms are preferably expressed in terms of either log luminance of the associated pixel and/or of BASE (the bilateral filtered log luminance value associated with the pixel). In the example, calculations for BASE and for the compression factor are performed using the logarithm of the luminance of the pixel values and the original compression factor may be expressed as 10 raised to the power BASE(c−1) indicating that conversion from the logarithmic space or domain back to the linear space or domain has taken place for the compression factor value CF in the original bilateral filter equations. In the examples, the additional factor is expressed optionally using the variable BASE and/or the variable log(Y) both of which are still in the log luminance domain. Thus, for the example, the new compression factor is created by combining the compression factor from the prior art bilateral filter compression factor expressed in the linear domain with a modifying factor or product term that preferably includes a rational expression that includes a variable or variables that are in the log luminance domain. This rational expression is preferably included as a direct multiplier of the exponential compression factor (in the linear domain) from the original bilateral filter equation. The compression ratio c in the original bilateral filter equation is preferably adjusted to provide the desired overall image compression with the additional factor included in the expression for the new compression factor taken into account. It has been observed that the numerator of the rational expression which is added as a product term works well when it is of degree 2 and that desired results are particularly sensitive to the choice of zeros for the expression relative to the minimum value of the BASE for the image. It has also been observed that the results when appropriately scaled are relatively insensitive to the polynomial expression in the denominator of the rational expression so long as it does not have zeros close to values of BASE or log(Y) which occurs in the image. It has been additionally observed that for a range of expressions that provide desirable tone mapping characteristics, nearly equivalent results may be obtained when the degree of the polynomial in the denominator of the rational expression is 0, 1, or 2 provided that compensating adjustments are made in the scale factor and in the compression ratio c used in the portion of the expression from the original bilateral filter and in coefficients in the polynomial term which remains in the numerator. Thus, choosing degree 0 for the polynomial expression in the denominator of the rational expression and providing only a numerator which may, for example, be a polynomial of degree 2 and which may even a polynomial of degree 1 is a desirable simplification which may reduce computational overhead considerably in some implementations.

The compression factor CF in the versions of the tone mapping equation as proposed by Durand and Dorsey may be expressed in terms of BASE without log(Y). Following this lead, for best utilization of the smoothing effects and halo reducing effects of the bilateral filter, it is preferable to give some preference to the use of BASE as opposed to log(Y) as a variable in the terms used in the modified tone mapping equation. However, use of log(Y) or of a mix of variables and even inclusion of other variables such as Y in its non-logarithmic form remains options in embodiments of this invention. Use of log(Y) in some implementations increases both apparent sharpness and noise as opposed to use of BASE as a variable in the product term added to the original tone mapping equation. Use of one or more intermediate variables such as DETAIL is convenient in explanation but is likely to be unnecessary and even counterproductive in calculations. The grouping and the intermediate variables have been used above for explanation and derivation and not to imply that such choices are optimal for calculation in the implementation.

Tone mapping algorithms classed as global contain no local terms and many tone mapping operators classed as local ones are not as amenable to partition into global and local tone mapping components as the original bilateral filter. It is not a requirement that such a partition exist but when it does, it may be used as above to provide insight about characteristics of the tone mapping operation. Above, the criterion was to consider the global component of the tone mapping algorithm to be the limiting case when smoothing effects of the bilateral filter were removed. The use of BASE in terms used to modify the original filter certainly adds both local and global components and may cloud the original distinction between global and local. This does not invalidate use of such terms in the modified bilateral filter.

Figure 9:
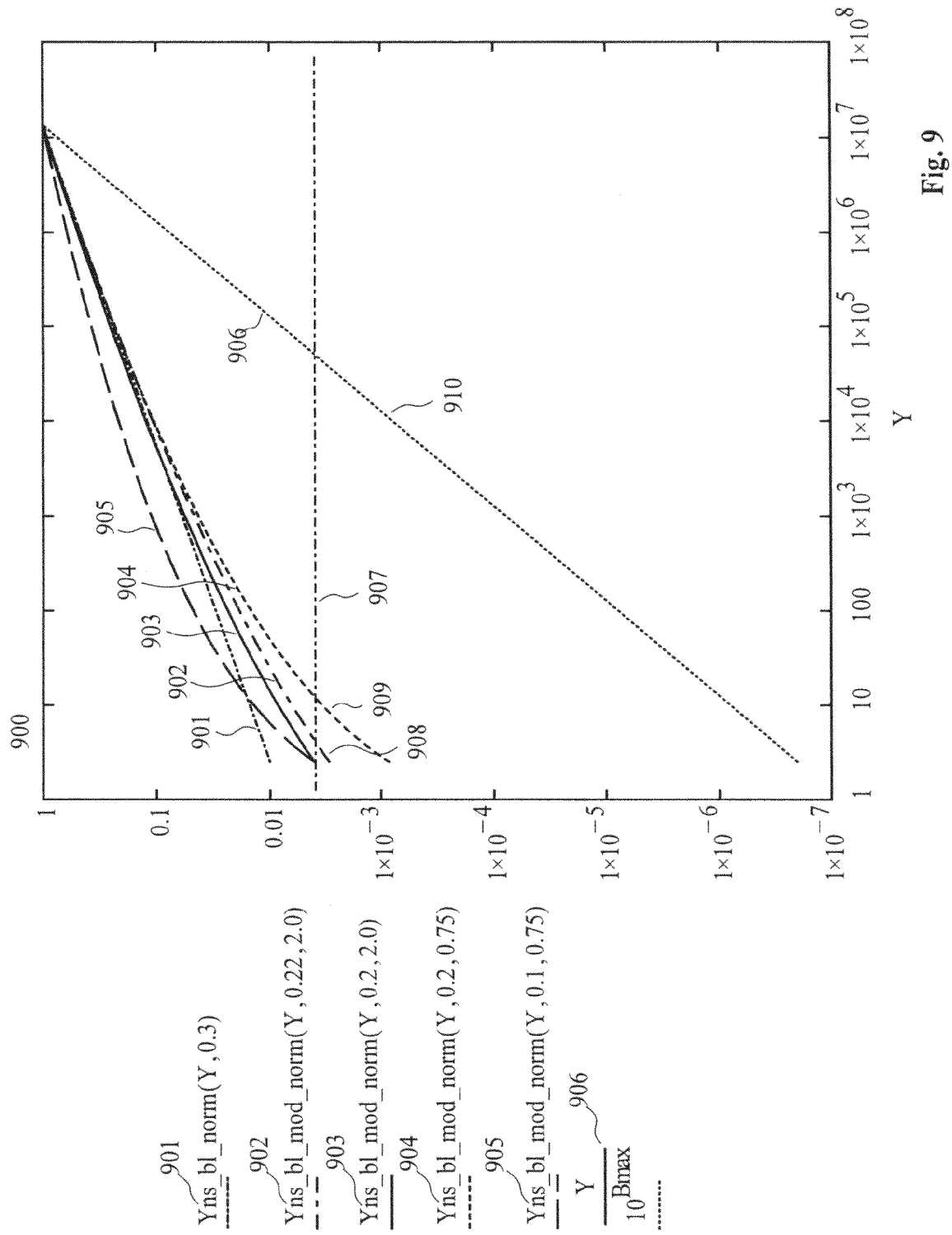
FIG. 9 depicts a graph including the global component for various tone mapping equations.

The plot 900 in FIG. 9 depicts the global component for various tone mapping equations including a linear one, the original Durand Dorsey one, and several examples of tone mapping equations of this invention. All are normalized to output a value of 1 for the highest luminance value that they are intended to map. FIG. 8 lists supporting equations and minimum and maximum values used in the plot. In FIG. 8 Bmin 801 is the general minimum value of BASE or log(Y) intended to be handled in tone mapping of the frame and Bmax 802 is the maximum value. These values may be based on any of a number of criteria including the minimum and maximum values of BASE and or log(Y) for the present image or for a previous image or images in a video or multi-frame sequence. Brange 803 is the difference between Bmax and Bmin. Ymin 814, Ymax 815, and Ymax/Ymin 816 are corresponding values in linear space. The values listed are ones used in equations for the plots in FIG. 9 and the values of Y for which points are plotted extend over the range from Ymin to Ymax. Note that the ratio of Ymax/Ymin 816 is slightly greater than 5 million which is a huge range compared to a dynamic range of 256 which is representative of many existing display technologies. CF 804 is the compression factor proposed by Durand and Dorsey and bFactor 805 is a modifying product term that serves as an example of the application of principles of this invention. The equation 806 expresses the factor in the form presented earlier and the form 807 depicts the same expression after reorganization to show that it is a rational expression. In this specification an expression that after possible reorganization may be expressed as a quotient of polynomial expressions is considered to be a rational expression. bScale 808 is constant for a given image and is used as a multiplying factor to normalize the tone mapping expressions which use bScale. b 809 is a product of bFactor and bScale. Ys_bl_norm 810 is a version of CF normalized to one for an input luminance which corresponds to Bmax. Ys_bl_mod_norm 811 is tone mapping compression factor using bFactor in accordance with principles of this invention and normalized to one for an input luminance which corresponds to Bmax. Yns_bl_norm 812 and Yns_bl_mod_norm 813 are variants of Bmax. Ys_bl_norm 810 and Ys_bl_mod_norm 811, respectively, for which BASE is replaced by log(Y) to depict the global tone mapping factor or, alternately, the limiting case of the tone mapping operation for which local smoothing has been removed. These are the expressions used in plots depicted in FIG. 9.

In the log plot 900 of FIG. 9, six characteristic tone mapping curves are depicted for various tone mapping equations. The plot 900 depicts normalized output luminance for each of the curves on the vertical axis as a function of input luminance Y on the horizontal axis. As explained above, for the tone mapping equations which include local operators, these plots indicate representative overall limiting characteristics with the local effects removed. Each of the six plots depicts the output of a normalized compression factor plotted against luminance which covers a range of approximately 5 million to one from 2.512 to $1.259 \times 10^7$. Plot 901 is representative of the prior art bilateral filter, plots 902, 903, 904 and 905 are examples that include a modifying factor in accordance with this invention and plot 900 represents linear scaling. In their normalized form, each curve has an output value of 1 for the maximum luminance value. The line 907 depicts the minimum output value on the vertical axis visible with a display medium with a dynamic range of 256 to 1 that is configured to display tone mapped values of 1 as its brightest pixel value. Output value from portions of the curve above this line are visible and output values below this line are not visible, thus portion 908 of curve 902, portion 909 of curve 904 and portion 910 of curve 906 which fall below line 907 are not visible on such a display medium. For linear scaling, curve 910 is a straight line with unity slope that provides visibility for only a small portion of the image luminance range. On a linear scale, this is a tiny portion of the image luminance range. For the prior art tone mapping algorithm, curve 901 is also a straight line but tone mapping equation 901 provides flexibility to adjust the slope through adjustment of the compression ratio that is the second parameter assigned a value of 0.3 in the example. There is not flexibility in the tone mapping equation to further shape the curve. The 4 curves 902 through 905 are plotted using the equation 1013 of FIG. 8 that according to principles of this invention includes a term bFactor that provides needed flexibility to alter the shape of the curve by adjustment of the parameters that is the third parameter in the function Yns_bl_mod_norm(Y, c, ϵ) used for plots 902, 903, 904, and 905. The first parameter is luminance Y, and the second is the compression ratio. Curves 902 and 903 are both assigned a ϵ value of 2.0 that provides a modest curvature that is concave downward in the plots 902 and 903. Curves 904 and 905 are both assigned a ϵ value of 0.75 that provides a substantially more pronounced curvature that is concave downward in the plots 904 and 905. Curves 902 and 904 are compression ratios of 0.22 and 0.2, respectively, that give each curve a slope at Y=Bmax that approximately matches the slope of line 901. However, as noted, the curves have respective portions 908 and 909 that are not visible for a display with a dynamic range of 256 as described above. The compression ratio has been changed to 0.2 for curve 903 and to 0.1 for curve 905 to demonstrate the flexibility to adjust curves to make desired features visible. Adjustment of c in prior art tone mapping equation 901 also provides this flexibility but does not provide flexibility to adjust and thereby characterize the shape of the tone mapping curve. The adjustment of shape is preferably done as part of the tone mapping operation so that post processing steps are not needed and so that the values of BASE are readily available as the preferred variable on which to base the modification of the shape of the tone mapped curves.

FIG. 10 includes three rational expressions cf(x, a, b) 1001, cg(x, a, b) 1002, and ch(x, a) 1003 each of which is used as a factor in a modified tone mapping expression. The expressions are shown as functions of x; each when expanded has an $x^2$ term in the numerator resulting in a polynomial of degree 2, in the numerator and cf, cg, and ch have, respectively, an $x^2$, an x, and a 1 term in the denominator, resulting in a polynomial of degree 2 in the denominator of cf, a polynomial of degree 1 in the denominator of cg and a polynomial of degree zero in the denominator of ch. The expression cg(BASE, ϵ, 2ϵ+Brange) is equal to the expression bFactor(BASE, ϵ) in FIG. 8. The expressions $CF_f$(BASE, c, a, b), $CF_g$(BASE, c, a, b), and $CF_h$(BASE, c, a), are modified compression factors formed using cf(BASE, a, b), cg(BASE, a, b), and ch(BASE, a), respectively, as product terms times CF(BASE, c). $CF_f$, $CF_g$, and $CF_h$ each contain an additional factor that normalizes the respective pixel luminance values to 1 when BASE is equal to Bmax.

FIG. 11 includes a log plot 1100 of five tone mapping operators, applied without smoothing as explained in association with FIGS. 8 and 9 on the vertical axis against luminance Y on the horizontal axis. The curve Yns_bl_norm(Y, 0.3) 1101 is the original tone mapping operator. It is used as a factor with different values for the compression ration c in each of the expressions 1102, 1103, 1104, and 1105 used for the remaining four plots. Expression Yns_bl_mod_norm(Y, 0.1, 0.75) 1102 which is defined in FIG. 8 and also plotted in FIG. 9 is included here for reference and, as explained previously, includes a modifying term bFactor which is a rational expression having a $2^{nd}$ order polynomial with the variable BASE in the numerator and a first order polynomial with the variable BASE in the d. As further explained above, this expression is equivalent to the expression $CF_g$(log(Y), 0.1, 0.75, 8.2)·Y 1102 that is also plotted and also has the rational factor cg with a $2^{nd}$ order polynomial in its numerator and a first order polynomial in its denominator. Both 1102 and 1103 use a compression factor of 0.1 in the exponential factor. $CF_f$(log(Y), 0.133, 0.7, 8)·Y 1104 has the rational factor cf with a $2^{nd}$ order polynomial in its numerator and also a 2nd order polynomial in its denominator. $CF_h$(log(Y), 0.065, 0.75)·Y 1105 has the rational factor cf with a $2^{nd}$ order polynomial in its numerator and a one (zero order polynomial) in its denominator. For the plots 1103 with the first order polynomial in the denominator, 1104 with the $2^{nd}$ order polynomial in the denominator, and 1105 with unity (zero order polynomial) in the denominator, and with adjustment of the parameters a and b and particularly with significant adjustment of the compression ratio c in the exponential term, the three expressions yield nearly identical results as indicated by the near coincidence of the overlaid plots of curves 1102, 1103, 1104 and 1105 shown as overlaid curve 1106 in FIG. 11. This result is preferably utilized to significantly simplify computation since the use of the new value of c has little or no effect on the computation of the exponential term and replacement of the denominator with unity in the rational expression considerably reduces both the complexity of the circuit and the time needed to compute the compression factor value $CF_g$. Since this computation is normally performed for each pixel in an image as part of the tone mapping operation, streamlining computational requirements can result in significant saving in the tone mapping operation.

Figure 12:
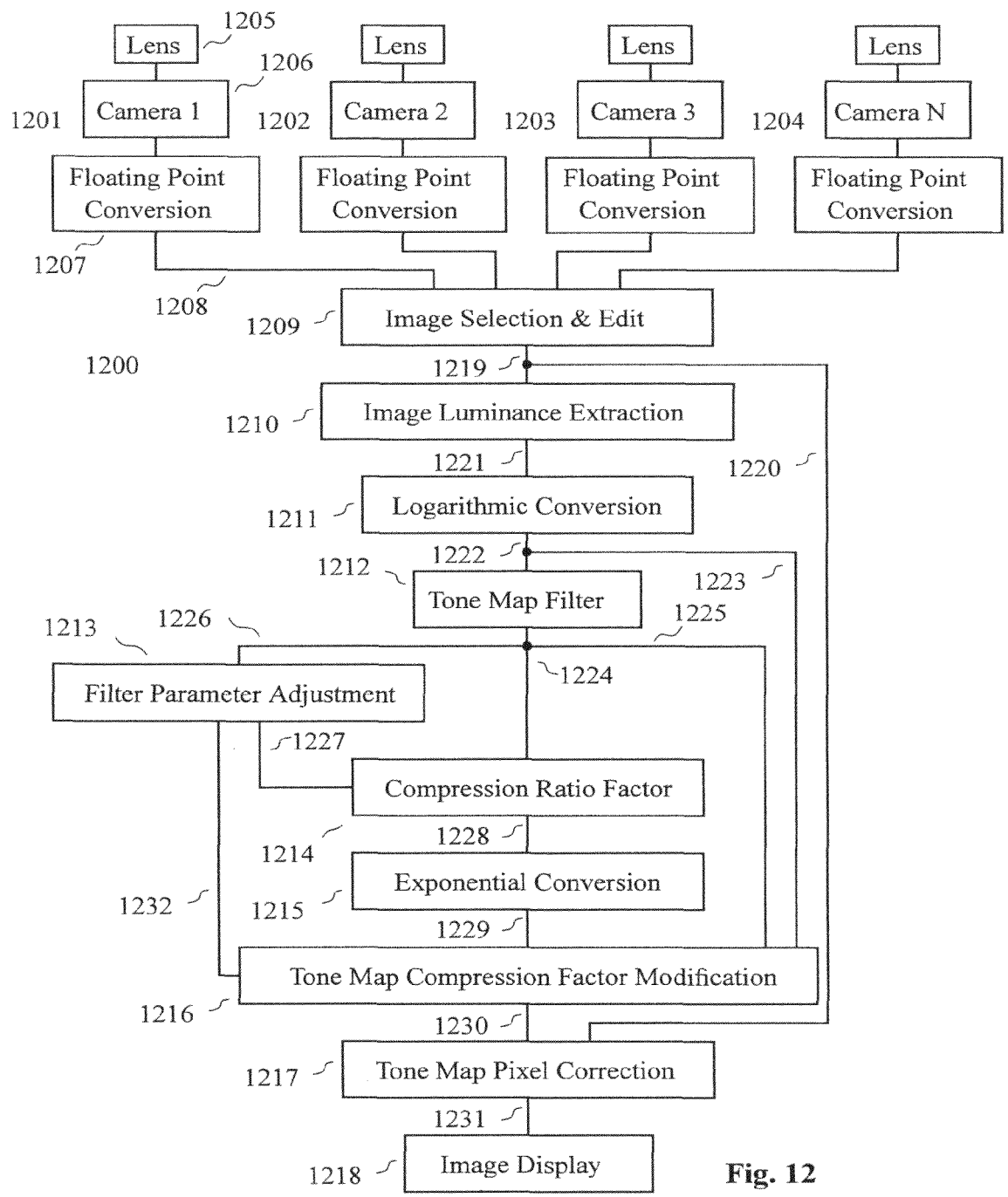
FIG. 12 depicts a block diagram of a system incorporating the present invention.

FIG. 12 depicts a system shown in block diagram form that includes one or more imaging devices which preferably have high dynamic range capabilities. FIG. 12 also includes an electronic circuit that performs a tone mapping operation in accordance with principles of this invention. In the device of FIG. 12, functionality of various blocks or portions thereof may be provided by general purpose computing elements that may also perform functions in other blocks. It is preferable to provide one or more specialized circuits to perform the computation intensive tone mapping operation in block 1212 of the diagram. Imaging device 1201 that is representative of the camera or cameras preferably includes a lens 1205, an imaging device 1206 that preferably captures high dynamic range images and an optional but preferable Floating Point Conversion unit 1207 to convert high dynamic range pixel data to floating point. The circuits to provide the floating point values in 1207 are preferably included as an integral portion of an integrated circuit which includes the imaging array of the camera 1201 as detailed in the disclosures incorporated by reference above. The pixel data is preferably serialized and transmitted to a unit 1209 that receives, buffers and edits image data preferably in floating point format. Additional second imaging device 1202, third imaging device 1203 and nth imaging device 1204 may optionally be included in the system and preferably have features similar to those provided for imaging device 1201. Image Selection and Editing unit 1209 preferably includes a digital signal processor or other processor unit and/or a graphics processing unit. The Selection and Editing unit 1209 is preferably capable of image selection, of adding text and optional graphics to image data, of optional image processing such as Bayer color interpolation, grouping of images, de-warping and resizing of images, image stitching, and optional feature recognition within images. Pixels of an image selected and assembled for tone mapping and display are transmitted over path 1219 to Image pixel Luminance Extraction unit 1210 and to Tone Map Pixel Correction unit 1217 where pixel values received over path 1220 are multiplied by the tone mapping correction factor for the pixel received over path 1230. After pixel luminance extraction in unit 1210, pixel luminance values are transmitted over path 1221, preferably in floating point form to Logarithmic Conversion unit 1211 where the values are converted to logarithmic form and output on path 1222 preferably in fixed point, integer format but optionally in floating point format.

The logarithmic and exponentiation conversion units preferably employ optimizations that are based on properties of the logarithmic and inverse exponential relationships between values in the log and linear domains. Many of the preferred features of the log and exponentiation conversion circuits described herein apply both to the logarithmic conversion from luminance space to log luminance space in 1211 and to the inverse exponential conversion from log luminance space back to linear space in 1215. Some of the specialized techniques for performing these specific conversions include use of lookup tables. (The use of lookup tables and various interpolation methods are used in prior art in other applications.) The property that a given increment in the logarithmic space or domain corresponds to a given ratio in the corresponding linear domain provides synergy with first converting the values to undergo logarithmic conversion to a normalized floating point form and partitioning logarithmic values to exponentiate into integral and fractional parts. The use of floating point values may be initiated at any point prior to the logarithmic conversion but the relative compactness of the floating point representation along with the large numerical range of light levels captured by high dynamic range imaging devices such as in the disclosures incorporated by reference above make it preferable to convert to or preserve a floating point representation of pixel data early in the chain, even as part of the imaging device circuit. It is then preferable to utilize the floating point representation by provision of circuits in Image Selection & Edit unit 1209 and in Image Luminance Extraction circuit 1210 that operate using floating point arithmetic. For digital computation, binary format is a normal representation so the following will refer to binary representation with its natural relation to two to one ranges or octaves. For binary numbers two to one ranges or octaves are analogous to ten to one ranges or decades for a base ten number system.

Various features of preferred circuits for the Logarithmic Conversion 1211 to convert linear to logarithmic values or for the Exponential Conversion 1215 to convert logarithmic values to linear form are described below. The description will focus on the binary system but may be extended to other bases such as natural log or base ten. Logarithmic representations in the various bases differ only by constant multiplying factors so one skilled in the art may readily convert between bases. Beginning with a binary representation or a non-normalized floating point representation, the binary exponent may be determined by determining the number of leading zeros in the binary representation of the number, subtracting this number from the starting numerical value for the exponent, and shifting the fractional or non-exponential part of the number left by this number of places. In standard floating point representations such as specified in the IEEE754 standard, an offset is added to the exponent to provide a range of negative exponent values and the leading one in the fractional non-exponential portion of the value is suppressed for fully normalized ranges. This leading one is the digit that, when non-variable, approximately halves the size of a lookup table and/or decoding circuit needed for the linear to log. In an analogous way in scientific notation, it is customary to place exactly one non-zero digit before the decimal point of the non-exponential portion of the number which contains the fraction. From this it is seen that the fractional non-exponential part of the value referred to as the fractional part herein may optionally contain an integral portion whose value is preferably less than the radix of the number system. Other conventions may be adapted such as placement of the decimal just before the first nonzero digit. These options will not be covered in detail here and one skilled in the art may supply them. The logarithm of zero is not defined. In the wide dynamic range systems to which this system is particularly applicable, zero pixel or luminance values which do not convert to a finite logarithmic value are handled specially or, as an alternative, pixel values are adjusted to eliminate values of zero before performing the logarithmic conversion. For example, 0 values may be replaced by the smallest incremental nonzero pixel value or the smallest nonzero value may be added to every pixel value before conversion. With a normalized binary floating point representation of the luminance value, the integral portion of the logarithm to the base 2 of the number is equal to or directly related to the value of the binary exponent and the fractional or non-exponential portion is equal to or directly related to the logarithm of the fractional or non-exponential portion of the normalized binary floating point number. The range of this number in the normalized floating point representation spans only one octave so the linear to binary conversion needs also to span only one octave. Since 8 to 10 bits of resolution is typical for digital imaging pixel data and resolutions seldom exceed 14 bits, the normalized one octave representation of a pixel value or of its luminance value is not likely to have a useful accuracy which exceeds that provided by the analog to digital conversion of the pixel value to digital form. So, for example, with imagers that provide 10 bit resolution for readout of pixel values, logarithmic conversion may be performed by using a lookup table with $2^{10}$ or 1024 entries without substantial loss in the accuracy of the pixel data. Decoders or various interpolation techniques to further reduce lookup table size and or increase accuracy may also be provided. It is preferable but not required to provide values to be converted that are in fully normalized form. The benefit is that only one octave or more generally an interval of repetition equal to the base of the logarithm is covered by the data thereby limiting the number of lookup table entries or encoding combinations to approximately half of the number needed to handle values which may have leading zeros. Additionally this provision assures that significant digits in the fractional or non-exponential portions of the numbers are more fully utilized resulting in more consistent linear to logarithmic or logarithmic to linear conversion accuracy.

For the inverse exponential conversion performed in block 1215, the integral portion of the logarithmic value may be mapped directly to the exponent of a binary representation of the exponentiated value and the fractional portion of the logarithm may be exponentiated using a lookup table or decoder similar to that provided for the linear to logarithmic conversion but mapping exponentially from logarithmic values to linear values instead of from linear values to logarithmic values as done for the logarithmic conversion. In a way that is analogous to the linear to logarithmic conversion, it is preferable to begin with a value for which the integral and fractional portions are separated. Then the integral part maps to an exponent of the base of the logarithmic value and the fractional portion may be converted using a lookup table. The resulting value may then be normalized in floating point form or retained in an integer format by shifting or optionally multiplying the converted fractional part by the value of the exponential part.

Logarithmically encoded pixel luminance values are communicated from the Logarithmic Conversion unit 1211 over path 1222 to the Tone Map Filter 1212. The filter 1212 is preferably similar to the one proposed by Durand and Dorsey that applies a bilateral filter to pixel data. This filter operates on the logarithmically encoded luminance values for pixels in the image and communicates a base layer value associated with each pixel over path 1224. Tone Map Filter 1212 operates on the logarithmically encoded pixel data and for each pixel site in the image performs a spacial blurring of the logarithmically encoded luminance for pixels by performing a weighted average of logarithmically encoded luminance values including luminance values for pixels at pixel sites in the image that surround the said pixel site. The spacial blurring operation for each said pixel site includes calculation of a weighted average of the logarithmically encoded luminance of the pixels in a spacial neighborhood of the said pixel site where the weighting factor decreases with increased spacial distance from the said pixel site and also with increased absolute difference in the logarithmically encoded luminance of the pixel value included in the average relative to the logarithmically encoded luminance of the pixel at the said site. The value computed as just indicated is referred to as the BASE value associated with the given pixel site. This BASE value is communicated to Compression Ratio Factor unit 1214 over path 1224, to Tone Map Compression Factor Modification unit 1216 over path 1225 and to Filter Parameter Adjustment unit 1213 over path 1226. The BASE value is preferably obtained using the bilateral filter on logarithmically encoded luminance values and a value of BASE is preferably supplied for each pixel location in the image. As just indicated, this filter provides a spacial blurring effect on the original image data in the log luminance domain and the blurring effect is weighted by inclusion of the distance in log luminance space to increasingly reduce the effect on the average of pixels whose luminance value in the logarithmic domain is increasingly distant from that of the pixel at the site for which the value BASE is being computed. This is the feature that mitigates haloing effects. Other filters besides the bilateral filter used by Durand and Dorsey that include this feature may alternatively be used to practice this invention.

In a preferred embodiment, the logarithmically encoded filtered luminance values, referred to as BASE values above, are communicated to three units. These include path 1226 to the Filter Parameter Adjustment unit 1213 that monitors the values of BASE, preferably over one or more images preceding the current one for repetitive frame rate imagers, and assembles data such as image histograms and averages of BASE and/or logarithmically encoded pixel luminance values on which to base selection of parameters which establish the compression ratio c communicated to the Compression Ratio Factor computation circuit in block 1214. Circuit 1214 provides a multiplying factor based on the compression ratio c that is applied to values of BASE and these scaled values are communicated over path 1228 to the Exponential Conversion circuit 1215 where the value is exponentiated to map it from the logarithmic to the linear domain. As an option, a constant value may also be communicated by the Filter parameter adjustment circuit over path 1227 for signed addition to the value calculated as a function of BASE and of c in the calculation performed prior to exponentiation. Addition of the logarithm of a factor in the logarithmic space prior to exponentiation is equivalent to multiplication following exponentiation so such a step may be used to perform an addition or subtraction of the logarithm of a constant factor to eliminate or simplify a multiplication step to scale the result after the exponential conversion in block 1215. This option is particularly useful for constants such as overall image scaling for normalization or other pixel scaling adjustment where the same value is applied to every pixel in the image. Then taking the logarithm of a constant multiplying factor and using signed addition before exponentiation in place of multiplying by the value after exponentiation may result in significant reduction in the complexity of the computational circuit. The Tone Map Compression Factor Modification circuit 1216 receives values to establish filter parameter settings over path 1232 from the Filter Parameter Adjustment circuit 1213 and incorporates the parameter settings in a factor that is also a function of the value BASE received over path 1225 and/or the pixel log luminance value received over path 1223. The exponentially converted compression factor (CF) value that is a function of BASE and compression ratio c is multiplied by the factor calculated by the Tone Map Compression Factor Modification circuit 1216 and communicated from the Tone Map Compression Factor Modification circuit 1216 over path 1230 to the Tone Map Pixel Compression circuit 1217 as a modified pixel compression factor for a pixel. The Tone Map Compression Factor Modification circuit creates a mixed expression of logarithmically encoded luminance values that have been exponentiated (1229) and logarithmically encoded luminance values that have not been exponentiated (1225 and/or 1223). This use of a compression factor that includes both exponentiated and non-exponentiated logarithmically encoded values related to pixel luminance provides the flexibility to shape the tone mapping characteristic to achieve improvements in tonal balance and key of the scene as set forth in this invention. In the Tone Map Pixel Correction circuit, individual pixel values received on path 1220 are adjusted by the compression factor value, calculated by the circuit 1200 that corresponds to the pixel to create a tone mapped image that is preferably suitably encoded and scaled for communication to Image Display 1218 over path 1231.

Circuits in FIG. 12 are depicted in simplified form with the intent of indicating preferred major communication paths between various components as one example of the application of the invention. Additional paths may be included and alternate embodiments of the invention may be structured quite differently.

A device to apply bilateral filter calculations to an array of values is described herein. In applications, the device is often used to filter an array of logarithmically encoded luminance values that correspond to pixels in an image. A bilateral filtering operation may be applied to arrays of values that have a defined spatial relationship. This is a cumbersome definition and the term pixel implies the spatial relationship so the term pixel or pixel value will be used to describe a value from the spatially related array of values that are input to the bilateral filter with the understanding that the invention may also be used to filter spatially related arrays that may not be defined as pixels. One of a number of applications for the device of this invention is use of the bilateral filter to compress high dynamic range images for displaying them at video rate. For application to high dynamic range compression, pixel values are often encoded as the logarithm of the luminance of the scene at the pixel location. For various filtering operations, especially ones associated with image processing, the bilateral filtering operation is particularly useful since it performs spatial smoothing using averages that are weighted spatially according to the distance of a pixel from the reference pixel location and also according to the magnitude of the difference between the value of the pixel at the reference location and the value of the pixel being included in the average. In this specification, the term reference location or reference pixel is used to designate the pixel or array location p for which the bilateral filter value $I^b(p)$ is being calculated. The weighting factors in the bilateral filter assign higher weight to pixels that are closer to the reference pixel and to pixels that have values that are close to the value of the reference pixel. The combined weighting factor is computed as a product of the spatial and the pixel weighting factors. The effect is to reduce or block the extension of smoothing to areas of high contrast including edges of higher contrast thereby limiting haloing and other artifacts that would otherwise result in unnatural image appearance and, depending on the use of the filter, in loss of image detail. Use of the filter may include but is not limited to use of Gaussian weighting factors. When the bilateral filter is used with Gaussian weighting factors, two sigma values are used to control the effective radii of the associated filtering effects, one for the spatial component and the other for the pixel value component. For image processing applications, the bilateral filter value is typically calculated for all or for a majority of the pixel sites in the viewable image and for each of these calculations, to minimize artifacts, it is preferable to include enough pixels in the weighted average so that pixels at sites that represent a relatively large percentage of the volume under the Gaussian surface are included in the calculation. For example, calculation over a 5 pixel by 5 pixel region in the image with the reference pixel at the center of the 5×5 pixel region has been shown to yield very good results in some applications. When too few values are included in the calculation, more artifacts will appear in filtered images. In general, there is no harm in extending the weighted average over larger arrays of pixels except for the time and computational resources that are needed and for possible extension of boundary effects at edges of the image. This invention may be practiced with nearly any array size. The hardware resources used for calculation of each of the individual bilateral filter values will increase a little more than in direct proportion to the number of pixels included in the calculation of each of the bilateral filter output values.

The following equation is used in the preferred implementation of this invention:

$$I^b(p) = \frac{\sum\limits_{q \in \Omega(Q)} w_S(|q-p|) \cdot w_I(|I(q)-I(p)|) \cdot I(q)}{\sum\limits_{q \in \Omega(Q)} w_S(|q-p|) \cdot w_I(|I(q)-I(p)|)}$$

In the preceding equation, p and q are location coordinates, I(p) and I(q) are input values, preferably logarithmically encoded luminance values associated with pixels at locations p and q, respectively, and $I^b(p)$ is the bilateral filter value associated with pixel at location p. |q−p| is spatial distance and |I(q)−I(p)| is the distance between I(p) and I(q). For high dynamic range image tone mapping, |I(q)−I(p)| is preferably in units of logarithmically encoded luminance. $W_s(|q-p|)$ is the spatial weighting factor that is preferably a Gaussian expression having a sigma value $\sigma_s$ and $W_1(|I(q)-I(p)|)$ is the luminance weighting factor that is preferably a Gaussian expression having a sigma value $\sigma_1$. For practical purposes, values included in the calculation for each point p are normally limited to ones that fall in a preferably square array with the point p preferably at the center of this array. The quality of results is normally satisfactory when the array used in the calculation is large enough to include pixels that have relatively large weighting factors that result from the product $W_s(|q-p|) \cdot W_1(|I(q)-I(p)|)$ in the preceding equation. The numerator of $I^b(p)$ is a summation of product terms each including a triple product of the spatial and the luminance weighting factors times I(q) and the denominator is a summation of the product of the same spatial and luminance weighting factors without the product with I(q). Division by the summation in the denominator serves to normalize the expression for the total value of the weighting factors. This normalizing effect helps to mitigate the effects of exclusion of terms with lower weight from the summation and also mitigates effects of using approximated values for the weighting factors. These approximations may, for example, result from use of lookup tables that have a limited number of entries with limited bit width to provide the value or partial value of $W_s(|q-p|) \cdot W_1(I(q)-I(p)|)$. To benefit from the compensating effect of the division by the summation of the weighting factors in calculating $I^b(p)$, it is preferable to include the same set of values in the expressions for $W_s(|q-p|) \cdot W_1(|I(q)-I(p)|)$ in products with pixel value included in the summation in the numerator as are included in the set of values that are directly summed in the denominator and to generally maintain a higher degree of precision in the sums, products and in the final division of the numerator by the denominator than may be provided for individual values for $W_s(|q-p|) \cdot W_1(|I(q)-I(p)|)$.

Many calculations are needed. As an example, for calculation using 5×5, 7×7, or 9×9 array of pixels, each summation in the equation above has 25, 49, or 81 terms, respectively, and this evaluation is normally performed for each pixel in an image, perhaps with special treatment of pixels near the border of the image for which the full array of neighboring pixels is not available. A number of options are available for these points and include but are not limited to: not providing a bilateral filter value for these areas; using the original pixel value in place of a calculated bilateral since the bilateral data is a smoothed variant of the original data; or performing the bilateral calculation using available data values and bypassing or substituting a prearranged value for terms for which no data is available. A preferred option is to calculate bilateral filter values for terms that are on or near the image border and to suppress summation of or substitute zero for values of $W_s(|q-p|)$ or $W_1(|I(q)-I(p)|)$ when q is outside of the image. The normalizing value in the denominator then compensates for values that are missing from the summation that appears both in the numerator and the denominator. In a preferred embodiment of this invention, the circuit is constructed with the following attributes. The dimension of the array of pixel values to include in the calculation for each evaluation of $I^b(p)$ is preselected and the circuit is preferably designed to include pixel values from the array in the calculation. The layout of the circuit provides temporary storage for the array of pixel values used to calculate an individual bilateral filter value and the values other than the reference value in the array are partitioned into groups, preferably with four pixel values in each group, so that pixels in each group are preferably approximately the same distance from the reference pixel. It is also preferable to configure the array for temporary storage so that stored values in a group are in close proximity one to another in order to reduce the length of data paths in the circuit. Pixels of each group are selected in sequence, preferably one at a time from each group but preferably all of the groups of pixels perform the selections simultaneously. Circuits are provided to calculate filter terms associated with each individual pixel selected from its associated group. The calculations are preferably performed in parallel for the individual pixels selected from each of the groups and the circuit preferably provides parallel addition of the terms computed in parallel to provide partial sums of the filter terms including a first partial sum for the summation in the numerator and a second partial sum for the summation in the denominator for the bilateral value being calculated. The second, the third, and the fourth pixels from each group are similarly selected in sequence and calculations performed and added to the previously accumulated partial sums. Terms for the reference pixel are preferably added to the sum of terms for the first selected pixel from each group as part of the parallel summing operation to initialize the accumulated partial sum and thereafter the partial sums for the second, third, and fourth pixels are added to the sum accumulated from the previous partial sums. Following addition of the terms from the fourth pixel of each group, the summations are complete and the numerator term is divided by the denominator term to provide the calculated bilateral value. Pipelining does occur at various stages in the embodiments provided to illustrate the invention and additional pipelining stages may optionally be added or some of the pipelining stages shown in the embodiments may be removed. In the exemplary design, a bilateral filter calculation may be completed every 4 clock cycles and, using this number of clock cycles per value calculated, most of the computational circuits that are provided for parallel operation perform an operation during substantially every clock cycle during the calculation of the bilateral filter pixel values. The full four clock cycle period to compute successive bilateral filter pixel values is available for the more computationally difficult divide operation used to divide the summation in the numerator by the summation in the denominator to provide the bilateral filter output value. In the design, circuits that are provided as approximate duplicates to provide parallel operation are each associated with a group of pixels that are all substantially the same distance from the reference pixel and the circuits are preferably specifically characterized to provide the spatial weighting factor based on the distance of pixels in associated group from the reference pixel. Each circuit associated with each group of pixels preferably utilizes a lookup table to provide the combined spatial and pixel value weighting factor as a function of the input address that is preferably generated as a function of the absolute value of the difference between the reference pixel value and the value of the pixel to which the weighting factor applies. The lookup table may optionally have predetermined values but is preferably configurable to permit adjustment in the sigma values or to even incorporate an alternate kernel function that may but does not need to be Gaussian. A detailed study has not been performed to verify this, but it is anticipated that 256 or even fewer lookup table entries having 8 bit word lengths will provide satisfactory resolution for the combined Gaussian weighting functions.

Up to this point, most of the description has focused on calculation of a single value of $I^b(p)$. As indicated, such values are normally calculated for pixel locations over an entire image with omission of or special consideration for areas close to a border. It is not required but often preferable to calculate filter values in the same general order that image pixels are acquired that is pixel by pixel for each row and then row by row for the image frame. In examples herein, it is assumed that the sequence of calculation is pixel by pixel from left to right and row by row from top to bottom (This is an option that does not need to be followed to practice the invention). To perform a calculation, pixel data is preferably available for the array of locations surrounding the reference pixel that is used in the calculation. Thus needed portions of a stripe of the image with a number of rows that equals or exceeds the number of rows used in the calculation is preferably provided to supply data for the calculation. The array of pixel data accessed for calculation of an $I^b(p)$ value is preferably copied to a special buffer for fast access during the calculation. By performing the successive bilateral calculations using a neighboring pixel as the reference pixel for the immediately succeeding bilateral filter output pixel value calculation, the data needed for the successive calculations differs only by having one column (or row) dropped off and one new column (or row) introduced. This also greatly reduces the number of pixels that need to be copied from the image to the calculation circuits by the square root of the number of pixels in the kernel. For example this reduces the number of pixel values copied from the image buffer to the calculating circuit for each bilateral filter value calculated from 25 to 5 for a 5×5 array, from 49 to 7 for a 7×7 array, and from 81 to 9 for a 9×9 array. Additionally, in preferred designs, a shift register configuration is used for each row of values stored in the array accessed by the calculation circuits and a buffer is provided for the next column of pixel values to be introduced so that a switch from the pixel data for calculation of one bilateral value to the pixel data for calculation of its successor simply entails shifting each row of pixel data in the calculation buffer by one pixel location thereby picking up the column of pixels just introduced and discarding the oldest column of pixels. The entire interval between calculation of successive pixel values is available to fill the column buffer of the calculation circuit from the image buffer and the pixel transfer from the image buffer to the calculation circuit buffer provides a convenient point to handle addressing logic to adjust for variation in the buffer location where image data may be stored in the input buffer.

In applications where the bilateral filter is provided as an inline component to process pixel data, data from the imaging device is normally presented pixel by pixel from a row and then row by row from an image frame. In the interest of reducing memory needed to buffer an image and to reduce delay in presentation of image data for viewing or further processing, a relatively narrow stripe consisting of successive rows of the image may suffice to provide data to perform the necessary operations. A number of rows that equals or exceeds the number of rows used for preprocessing steps such as Bayer interpolation where color filter arrays are used may be provided. Then additional buffer space may be provided to handle pixels acquired during the delay due to performance of successive calculations and buffer space may be provided for saving data in required format, for example, the Bayer interpolated pixel data, the logarithmically encoded luminance data, the bilateral filter output data. Then a number of rows of pixel data in the format to be filtered that equals or exceeds the number rows in the filter kernel minus one may be provided to be assembled to provide input to the bilateral pixel filter. For devices with this or similar organization of input data, it is preferable to compute data when it becomes available to reduce latency and buffer sizes. The use of memory above sounds like a lot but the total buffer memory size may still be a relatively small percentage of that needed to store an entire frame of the image and latency due to the processing steps may also be reduced to a relatively small percentage of the time between acquisition of successive image frames.

FIG. 13 indicates an array of pixel values that are used to calculate a bilateral filter value corresponding to the reference pixel 1319. The layout of the array in FIG. 13 preferably indicates the spatial relationship of pixels in the original array as used in calculation of the spatial weighting factors but does not represent the preferred physical layout of the data buffer array used for the calculation. A preferred physical layout will be indicted by the intermediate adjustment depicted in FIG. 14 and finally by the general layout after further adjustment shown in FIG. 15. The pixel data to be filtered may vary widely depending on the application. For logarithmically encoded luminance values from a high dynamic range image, 16 to 24 bit integer values may be typical but the invention is not limited to this range or to integer format. This just gives some perspective that with 18 bit integer values, for example, each of the 49 pixel values in the 7×7 array is a register that holds an 18 bit value and data paths like 1311 that link adjacent pixels in each row are preferably as wide as the registers. The pixel registers are organized in 7 rows 1301 through 1307 and each row is arranged as a shift register that is preferably configured to shift values from each pixel to its immediate neighbor away from the input side during a shift operation performed to present pixel values for calculation of a succeeding bilateral filter value. During a shift operation, data from the column of pixels on the left is lost and in the application new data is shifted from buffer registers, not shown in FIG. 13 but indicated in FIGS. 16 and 21, into the pixel in column 1308 at the right hand input side of the shift registers. In more detail row 1301 is organized as a 7 stage shift register with first input register 1312, connecting bus 1311, second register 1313, etc. through seventh and final register stage 1318. Each of the 6 remaining rows 1302 through 1307 is configured as a seven stage shift register similar to the first. The array is organized to indicate the relative locations of pixels one to another from the image or other spatially arranged array that is being processed by the filtering operation. In FIG. 13 each pixel has a distance grouping designation on the top. The number, 9 in the first line at 1310 is the distance grouping designation for pixel 1312. A two digit number in the second line, 00 at 1309 has a first digit that represents a relative row number and a second digit that represents a relative column number to indicate the location of the pixel in the array. The numbering is non-negative and begins at 00 for pixel 1312 in the upper right corner of the array. The row and column numbering is only intended to keep track of pixels as the layout is altered in FIG. 14 and again in FIG. 15. Pixel 1319 at location 33 is the reference pixel. The distance grouping designation is of interest since, for a substantially uniform array, the location of a pixel relative to the reference pixel indicates its distance from the center pixel permitting pre-calculation of the value of $W_s(|q-p|)$ for a pixel at a particular location in the array. As a further benefit that will be used in this invention, various groups of pixels in the array are substantially the same distance from the reference pixel so that the same value of $W_s(|q-p|)$ may be used in the calculation for these pixels. Pixels with distance grouping designation 1 are each 1 pixel away (Here it is coincidental that grouping designation 1 is one pixel pitch unit from the reference pixel since the grouping designations are intended only to classify groups of pixels that are substantially the same distance from the reference pixel.) from the reference pixel 1319 and distance grouping designations for successively greater distances range to 9 for the four pixels at the corners of the array. Note that there are either 4 or 8 pixels in each of the grouping designations. For any pixel in the array other than the reference pixel, three other pixels at 90 degree rotational increments are substantially the same distance from the center reference pixel 1319. For pixels on the diagonals or on the horizontal or vertical center lines of the array, there are only 4 pixels with the same distance grouping designation that is the same distance from the center reference pixel. The remaining pixels that do not lie on a 45 degree diagonal or on a horizontal or vertical centerline of the array each have 8 pixels that are substantially the same distance from the center pixel. (Larger arrays may have equalities in distance groups in addition to ones described here due to geometric relationships such as the 3, 4, 5 right triangle. Such additional relationships do not limit the applicability of the groupings indicated herein.) Each such pixel has 3 others at 90 degree rotational increments and additionally there is a second set of 4 pixels having the same distance from the center that also has the 90 degree rotational symmetry from one pixel to the next but whose pixels also have mirror image symmetry relative to the first set. Letter a suffixes are used to designate one of the subsets having the 90 degree rotational symmetry and a letter b suffix is used to designate the other mirror image subset whose members also have the 90 degree rotational symmetry. All 8 of the members of one of these groups have the same value for the spatial weighting factor $W_s(|q-p|)$ so computationally there is no distinction. In steps illustrated in FIGS. 14 and 15, the layout of the array will be adjusted to provide spatial clustering of pixels other than the reference pixel into clustered groups of 4 pixels where pixels of each group are substantially the same distance from the reference pixel in the original array and thereby share the same spatial weighting factor $W_s(|q-p|)$ The pixels on the 45 degree diagonals or the vertical and horizontal center lines also possess mirror image symmetry but the mirror image maps each of these particular sets onto itself so the additional set of equidistant pixels are not present.

In FIG. 14, pixels on the side opposite the input side of the array of FIG. 13 are folded approximately about the centerline over the portion containing the shift register inputs. Then pixel spacing is adjusted so that the pixels nest together rather than overlying one another. Electrical shift register connections are preferably not altered in rearranging the layout in either of FIG. 14 or 15. The pixels 1312 through 1318 in row 1301 of FIG. 13 are mapped to pixels 1412 through 1418, respectively, in FIG. 14 and each row of pixels assumes a "hair pin" like configuration. The reference pixel 1419 is now on an outer boundary (left hand side) of the modified array.

Figure 15:
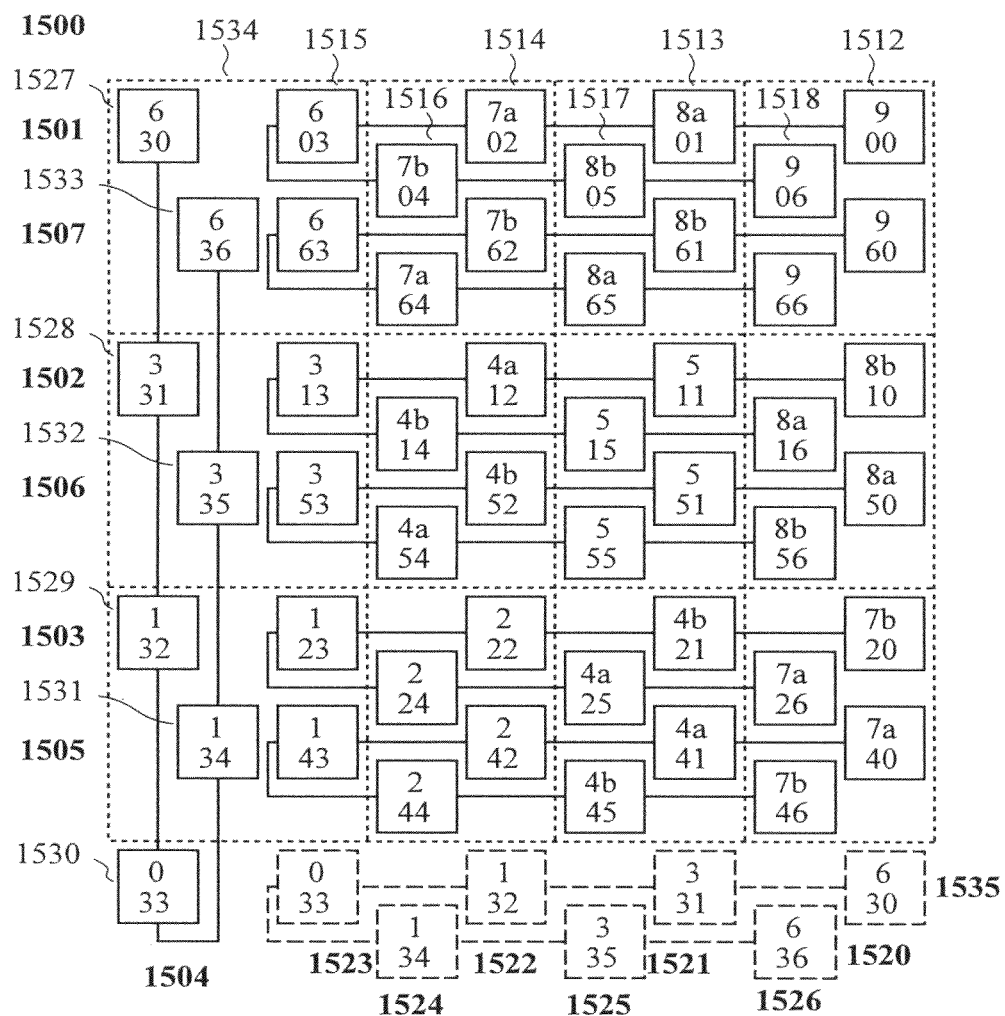

In FIG. 15 rows are spread apart and the half of the array that contains the last row is generally folded up over the other portion of the array with adjustments made so that the elements do not overly each other but nest together former last row next to first row, former second row next to next to last row etc. Another perspective is that alternate rows in the original layout now alternate one with the other with reversed row order for exactly one of the overlapped sets of rows. Row 1401 maps to row location 1501. Row 1407 is moved up to row location 1507 just below row location 1501. Row 1402 maps to row location 1502 just below row location 1507. Row 1406 maps to row location 1506 just below row location 1502. Row 1403 maps to row location 1503 just below row location 1506. Row 1405 maps to row location 1505 just below row location 1503. Row 1404 instead of mapping to the row shown in dashed outline at 333, is mapped to column location 1504. The grid 334 shown in dashed form has twelve cells in three rows of four cells each. Each of the cells contains a group of four pixel storage locations and pixels in each of the twelve dotted boxes have the same distance grouping designation. (Here a and b suffixes are disregarded. As indicated before distances are substantially equal for pixels having the same numerical distance grouping designation. The alternating presence of the mirror image set designations a and b verifies that the folding paradigm with its mirror imaging properties used to rearrange the cells does utilize the mirror image symmetry to cluster pixel value storage locations into groups each having four pixels that are substantially the same distance from the reference pixel in the original array. The techniques demonstrated to arrange the layout into groups of four pixels having substantially equal distance from the reference pixel extends to any square array of pixels with an odd number of rows and columns. In the circuits in FIGS. 16 and 19, the layout is utilized to facilitate the addition of selection circuits to successively present pixel values for pixels that are substantially equidistant from the reference pixel to a computation circuit that is characterized to compute values for pixels having the given distance from the reference pixel. The reorganization of the layout demonstrated in FIGS. 14 and 15 is optional and many variants may be employed. The intent is to bring clusters of four pixel that are substantially equidistant from the reference pixel into closer proximity with each other to facilitative layout in selecting one of four of the pixel values in each of these clusters to compute the bilateral filter value as part of a multiple clock period operation that utilizes repetitious use of parallel circuits to compute a bilateral filter value.

Figure 16:
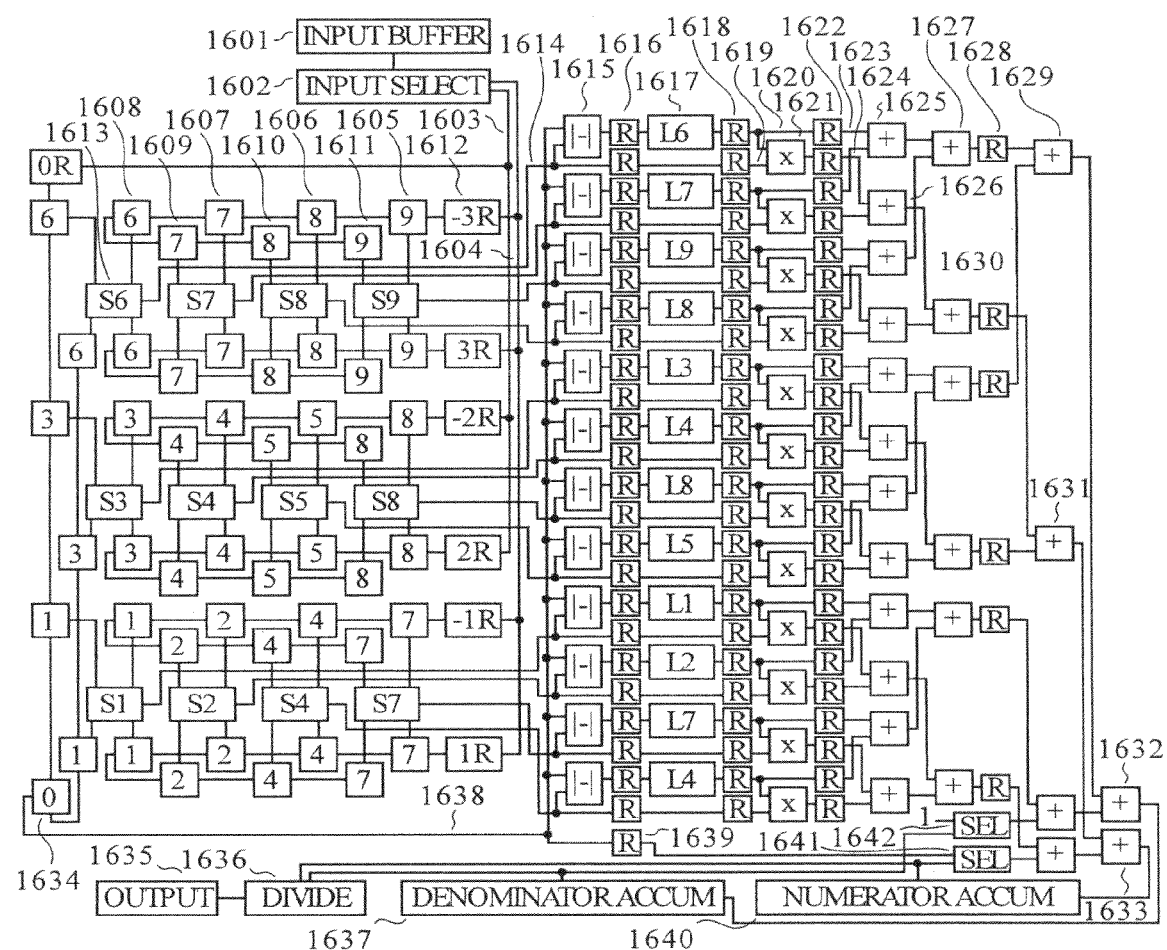
FIG. 16 depicts a storage array for pixel values used to compute a bilateral tone mapping filter value with a 7×7 kernel.

In FIG. 16 storage for pixel values used to compute a bilateral filter value with a seven by seven kernel is preferably arranged with clusters of four pixels where pixels in each cluster are approximately the same distance from the reference pixel. Pixel distance is indicated in FIG. 13 and a layout to cluster the pixels is indicated in FIG. 15. Only the distance grouping designation is indicated for each pixel storage site in FIG. 16, since this is the primary property used to distinguish handling of the pixels in FIG. 16. Pixel storage sites 1605 through 1611 correspond, respectively, to pixels 1512 through 1518 in FIG. 15. A pixel storage buffer labeled −3R at 1612 receives pixel data from bus 1604. The input select circuit 1602 reads pixel values preferably two at a time from the image input buffer 1601 and selects the appropriate bus 1603 or 1604 over which to communicate the pixel values to one or two of the column buffers in the set of seven buffers −3R through 3R. Buffers −3R through 3R are selectively enabled to receive a pixel value communicated over the input bus to which they are attached and select signals to each buffer are synchronized to register the desired new value in each of the buffer registers. The circuit is preferably configured to provide seven new pixel values for the seven column buffers −3R through 3R during a four clock cycle period so that the new column of pixel values is available to be shifted into the array to provide pixel data to calculate the next bilateral filter value. The reference pixel 1634 corresponds to pixel 1530 in FIG. 15. Its value is communicated to each of the 12 parallel calculation circuits on bus 1638. Twelve select circuits are added to the value storage shift register structure described in FIG. 15. Select circuit S6 1613 selects each one of the four pixels in the cluster of four pixels having a distance grouping designation of 6 in sequence, one at a time, and communicates the value on bus 1614 to a computation circuit having components 1615 through 1624 that are dedicated to computation of bilateral filter terms for the group (preferably of four pixels) that are substantially equal in distance from the reference pixel 1634. Reference to FIG. 13 indicates that pixels with a distance group designation of 6 are 3 pixels away from the reference pixel. The values written into the lookup table L6 1617 are set to include the spatial weighting factor for the 3 pixel distance just indicated. Values written into the lookup tables also include the effect of the sigma values used for the spatial and the pixel value filter terms and the weighting function used for the calculation. A product of spatial and value based Gaussian weighting functions is preferred. The effect of the spatial component is generally included by multiplying or scaling all of the table lookup values by the spatial weighting factor and the pixel value based weighting factor is included as a function of the lookup table address. A similar inspection of FIG. 13 for each of the 11 remaining lookup tables may be used to determine the distance to use to calculate the spatial weighting factor for the distance and the corresponding lookup table may be set to include the effect of the spatial weighting factor. Note here that there are three groups of eight pixels (groups with distance grouping designations 4, 7 and 8) that have the same distance grouping designation. This is the reason for duplicate S4, S7, and S8 selection circuits and duplicate L4, L7, and L8 lookup tables. This duplication permits uniform loading of all of the circuits in groups of four. If speed is not as much of an issue as circuit size, options such as shared use of a lookup table to replace the lookup tables that are duplicated is an option. Preferably values written into each lookup table are multiplied by the appropriate spatial weighting factor so that the product term is included in the final value. Provision of entries in each lookup table that include the effect of the spatial weighting factor appropriate for the distance of the pixels processed using the lookup table from the reference pixel is the preferred mechanism for applying the appropriate spatial weighting factors to each calculated term in the bilateral filter calculation. Provision of entries in each lookup table for which the pixel value based weighting factor is a function of the address of the entry in the lookup table is the preferred mechanism for applying the appropriate pixel value based weighting factors for each term in the bilateral filter calculation. The circuit 1615 preferably computes a lookup table address that is a valid address for the lookup table and for which the value of the address indicates the magnitude of the difference between the value of the reference pixel and the value of the pixel for which the weight sum is being calculated. As an example, the value may be limited in magnitude and low order bits discarded as needed to provide a range of lookup table address values matched to the address range provided for the lookup table entries.

The lookup table memory may be initialized and used in the following way. The lookup table provides a value for the term: $W_s(|q-p|) \cdot W_1(|I(q)-I(p)|)$. The lookup table address is generated in the circuit 1614 and is based on the magnitude of the difference between the value of the reference pixel and the value of the pixel being processed. It corresponds to the argument $|I(q)-I(p)|$ in the expression for the weighting factor. The pixels processed using a given lookup table are chosen so $|q-p|$ is substantially the same for all of them and it follows that the spatial Gaussian term $W_s(|q-p|)$ is also the same so that the entry at each memory location in the given lookup table is scaled based on the value of $W_s(|q-p|)$ corresponding to the pixels for which the table is used. Lookup tables used for pixels that have a different distance from the reference pixel will preferably be initialized with a different set of values that reflects the different value for $W_s(|q-p|)$. When $\sigma_s$ and or $\sigma_1$ are changed or any other changes are made that alter the value of $W_s(|q-p|) \cdot W_1(|I(q)-I(p)|)$, the lookup tables may be rewritten with values that reflect these changes. The register synchronized memory output value 1620 from lookup table L6 1617 represents the value of the product of the two weighting factors $W_s(|q-p|) \cdot W_1(|I(q)-I(p)|)$ for the value of the selected pixel input on bus 1614.

The registers 1616, 1618, 1622 and 1628 labeled with an R are preferably clocked D type flip-flop registers that provide a flip-flop for each bit in the respective bus into which they are inserted. For each line in the input bus, they serve to set their corresponding output value to the value of the corresponding bus input line. The new values are registered on the active edge of the clock transition and are held until the next active edge of the clock transition. The effect is to delay signals passing through them by one clock cycle and to assert changed values synchronously with the next clock. They may provide nearly a full clock cycle for the D input signal to settle so that each block of logic between a pair of these flip-fops has nearly a clock cycle of time to respond to inputs and provide an output. The circuits are arranged so that the effect of the delays are accounted for and the number of delay elements placed in separate data paths are adjusted to synchronize data flow in the paths as needed for proper operation. The effect in this circuit may be referred to as pipelining since elements in the chain such as address generator 1615, lookup table 1617, multiply circuit 1621 and combined adder stages 1625 and 1627 may still respond to a new input during each successive clock cycle but time available to perform the string of tasks is extended by 4 clock cycles (one clock cycle for each delaying register placed in the data path). Register 1616 in addition to providing most of a clock cycle to perform the magnitude of difference function 1615 also presents new address values to lookup table L6 1617 in a synchronized fashion. The two registers in the signal path between selected pixel input value 1614 and multiplier input 1619 serve to synchronize the pixel value input 1619 and the weighting factor input 1620. Multiply circuit 1621 provides the product of the combined bilateral filter weighting factor with the pixel value on bus 1624 after register synchronization. The weighting factor 1620 is input to adder 1625 that provides the first stage of the parallel addition circuit for the sum of the weighting factors used in the denominator of the bilateral filter value. The product of the pixel value and the weighting factor 1624 is input to adder 1626 that provides the first stage of the parallel addition circuit for the sum of the weighted pixel values used in the numerator of the bilateral filter value. Each of the 12 terms are handled preferably in parallel and in a nearly identical fashion to the one just described. There is a pipelining delay of four clock cycles but a new term is preferably introduced with each clock cycle and select circuit S6 1613 is preferably controlled so that another one of the four pixels with the distance grouping designation of 6 is selected on each clock cycle for input over bus 1614 to the circuit just described. Following this pattern using the combination of sequential and parallel processing and using limited pipelining, substantially every parallel circuit is used in substantially every clock cycle to complete summation of the terms for a bilateral filter value on every fourth clock cycle. In the diagram, the emphasis is on data flow showing registers, arithmetic components and data bus paths so most of the connecting lines in the diagram represent parallel data buses. This is the reason that an uncluttered physical layout is very beneficial for compact layout. Control paths such as data selector circuit select addresses are not shown and these functions are outlined in this description. For clarity in the block diagram in FIG. 16, select circuit input connections are shown as connections to associated shift register pixel value storage locations. For all of the shift register stage except for the last in each row, the same value as used by the shift register is normally also presented on the bus that links the value storage register to the next value storage register in the shift register chain. It is presumed that actual connections might be made anywhere along these buses where a particular signal value is available. Circuits (not shown) are also provided to initialize lookup table memory for implementation for which the lookup tables are programmable. Any of a number of arrangements may be used for this implementation. With CMOS imaging arrays, it is common to provide a serial interface over which imager register settings and instructions may be communicated. Provision of this type of interface with the capability to write values to the lookup tables is a desirable option. In applications where images are captured continually and where lookup table contents is changed during operation, duplicate copies of the tables may be implemented with provision to switch address and data paths of the tables between use as indicated in FIG. 16 and an interface to write new values into the table. With this provision, one set of tables may be used while the other is initialized and when both copies of the tables are initialized, operation may be switched quickly from one to the other to provide flexibility to switch back and forth between the two sets of programmed filter parameter settings very quickly. For some applications, the ability to make rapid transitions in the settings and even to alternate between settings is beneficial.

Two partial sums are computed by the two nested parallel adder circuits that each perform a parallel sum of outputs from the 12 parallel computational circuits like the one just described. The circuits also include the input from reference pixel or accumulating register select circuits 1641 and 1642. The 12 parallel circuits handle the sum for all of the pixel values in the array except for the reference pixel 1634 that is included in the sum with a unity weighting factor. The unity weighting factor is selected by select register 1642 to be summed into the summation term for the denominator along with the first set of 12 values included in the summation for the denominator value and the value of the reference pixel, delayed enough by register 1639 to include the proper value, is selected by select register 1641 to be summed into the summation term for the numerator along with the first set of 12 values included in the summation for the numerator value. These partial sums that each include the reference pixel term are registered by the denominator accumulating register 1637 and the numerator accumulator register 1640, respectively, serving to initialize the registers and present the first of the four partial sums for addition to the next set of partial sums added in parallel for the next group of 12 values that are computed. For the three sets of values after the first, select register 1642 selects the value from the denominator accumulator 1637 for inclusion in each of the three partial sums after the first and select register 1641 selects the value from the numerator accumulator 1640 for inclusion in each of the three partial sums after the first so that at the conclusion of the forth partial sum, the denominator accumulator 1637 contains the sum for all 49 weighting factors for pixels in the 7×7 array and the numerator accumulated includes the sum of all 49 weighted pixel values for in the 7×7 array. Divider circuit 1636 inputs the numerator summation value from the numerator accumulator 1640 and the denominator summation value from the denominator accumulator register 1637 and performs the divide operation. Output block 1635 receives the bilateral filter output value from divide circuit 1636 and optionally saves the output bilateral filter value corresponding to the reference pixel in a buffer memory or passes it directly to a circuit output or to another stage for inclusion in additional calculations. The divide circuit has four clock cycles to perform the division for each bilateral filter output value.

Each of the two partial sums are preferably performed in parallel and are depicted as a binary tree with four successive adder stages forming a tree, the first stage summing values from six pairs of the twelve parallel computing circuits, to provide six output sums, the second stage summing three pairs of the six sums output from the previous stage to provide three output sums. These values are pipelined by registers in each output sum for each parallel adder tree as indicated by register 1628 in the denominator chain. The selected one of the reference pixel values and the accumulated partial sum for each adder chain is then added along with the three sums from the respective adder tree to provide four inputs that are reduced to two by the third adder stage and finally to one partial sum of 13 values for the numerator term and one partial sum of 13 values for the denominator term by the fourth and last stage of the adder chain. Dual input add circuits 1625, 1627, 1629 and 1632 provide one path through successive branches of the adder tree for the parallel adder for the denominator and dual input add circuits 1626, 1630, 1631 and 1633 provide one path through successive branches of the adder tree for the parallel adder for the numerator. The use of pipeline delay circuits has been intentionally avoided in the "feedback" paths from the accumulator register outputs back to the respective accumulator register inputs since such a delay would complicate the circuit needed to maintain desired operation. Thus, it is desirable when including summation of the accumulated partial sums from earlier stages of the accumulation sequence as inputs to the parallel add circuit, to introduce them at a stage that is free of pipelining delays from the point where they are introduced to the output of the parallel add circuit.

FIG. 17 illustrates a 9×9 array 1700 arranged so that pixels are clustered in groups of 4 each with pixel values that are substantially the same distance from reference pixel 1702. Dashed line grid 1701 contains 4 rows of 5 cells each that each contains one of the clusters of four pixel storage sites that have the same distance from the reference pixel in the original array.

FIG. 18 illustrates a 5×5 array 1800 arranged so that pixels are clustered in groups of 4 each with pixel values that are substantially the same distance from reference pixel 1802. Dashed line grid 1801 contains 2 rows of 3 cells each that each contains one of the clusters of four pixel storage sites that have the same distance from the reference pixel in the original array. FIGS. 17 and 18 are included to illustrate that the layout to arrange the array of pixels in clusters of four pixel storage sites each that all have substantially the same distance from the center reference pixel does not just apply to the 7×7 array of FIG. 15 but may be extended to any square array with an odd number of 3 or more rows and columns.

Figure 19:
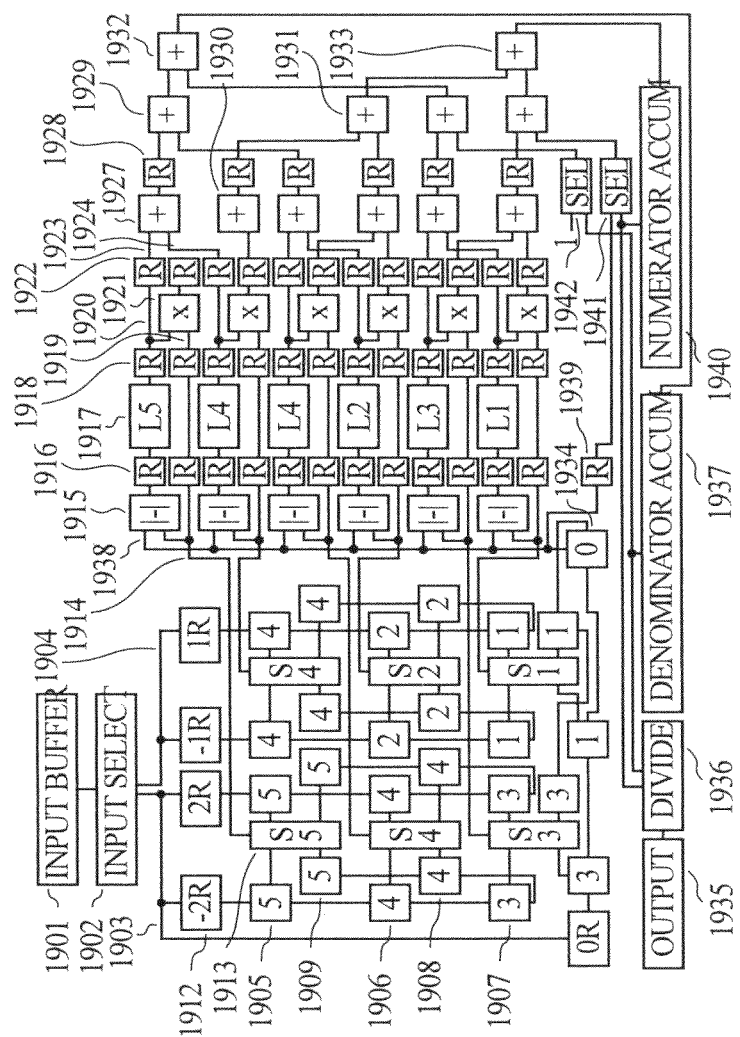
FIG. 19 depicts a storage array for pixel values used to compute a bilateral tone mapping filter value with a 5×5 kernel.

FIG. 19 is a circuit very similar to FIG. 16 but it depicts a circuit arranged to compute bilateral filter values over a 5×5 array rather that over a 7×7 array so that 6 terms are computed in parallel so that every 4 clocks cycles another summation of 25 terms for expressions in the numerator and denominator of the expression for the bilateral filter output value may be computed. To illustrate that the layout arrangement is not rigidly defined, the array for storage of the pixel values is arranged as indicated in FIG. 18 so that it has a layout very similar to that for the 7×7 array in FIG. 16 but in FIG. 19, unlike FIG. 16, the array is rotated 90 degrees counterclockwise in the circuit. This is optional and general guidelines for arranging pixels in clusters of 4 pixels that are each substantially the same distance from the reference pixel is still followed. Three stages rather than 4 provide the parallel summation of the six terms computed in parallel with the reference pixel value or accumulated partial sum value as determined by selection circuits 1941 and 1942. For an analogously arranged circuit to handle summation over a 9×9 array, twenty terms would need to be computed in parallel and five levels would be needed for an analogous layout of the parallel adder circuit.

The filter circuit that has been described may be implemented to filter images at video rate using a relatively small area on a CMOS integrated circuit silicon substrate and may even be included on the same substrate with an imaging array. Power dissipation may also be relatively small and price may be reasonable. The filter just described is used as the computation intensive portion of a high dynamic compression circuit that has been shown to retain and convey image detail in a pleasing way while providing a dramatic reduction in the dynamic range needed to present the image in comparison to the dynamic range recorded by a high dynamic range camera or other imaging device. Since the bilateral filtering operation is the computationally demanding step in one of the best ways to compress a high dynamic range image to a range that may be JPEG encoded, displayed, transmitted, and printed in a normal way; the computational circuit for the bilateral filter described herein to efficiently produce the filter values even at video rate is an enabling device to permit the high dynamic range compression to be packaged with a high dynamic range imaging device. This allows the high dynamic range image that is captured to be converted to a normal dynamic range at the camera or image capture source while retaining much of the high dynamic range information that is captured and to convey it to a viewer in a pleasing format using a combination of normal, relatively low dynamic range, devices for one or more of the steps of image data compression, image transmission including RF transmission, image storage, and image display including printing. These attributes make the device of this invention desirable for high dynamic range tone mapping applications to compress images captured by a high dynamic range imaging array to a normal displayable dynamic range that may be viewed using a conventional display or printed using normal printing techniques. Furthermore, after compression to a conventional dynamic range, using 8 bits or 256 values per color per pixel, for example, the data to render the image may be further compressed using conventional JPEG compression to further facilitate transmission or storage. The tone mapping may also be done using a minimal amount of image buffering storage space and with introduction of minimal added delay in the path between the image capture and image viewing.

Figure 20:
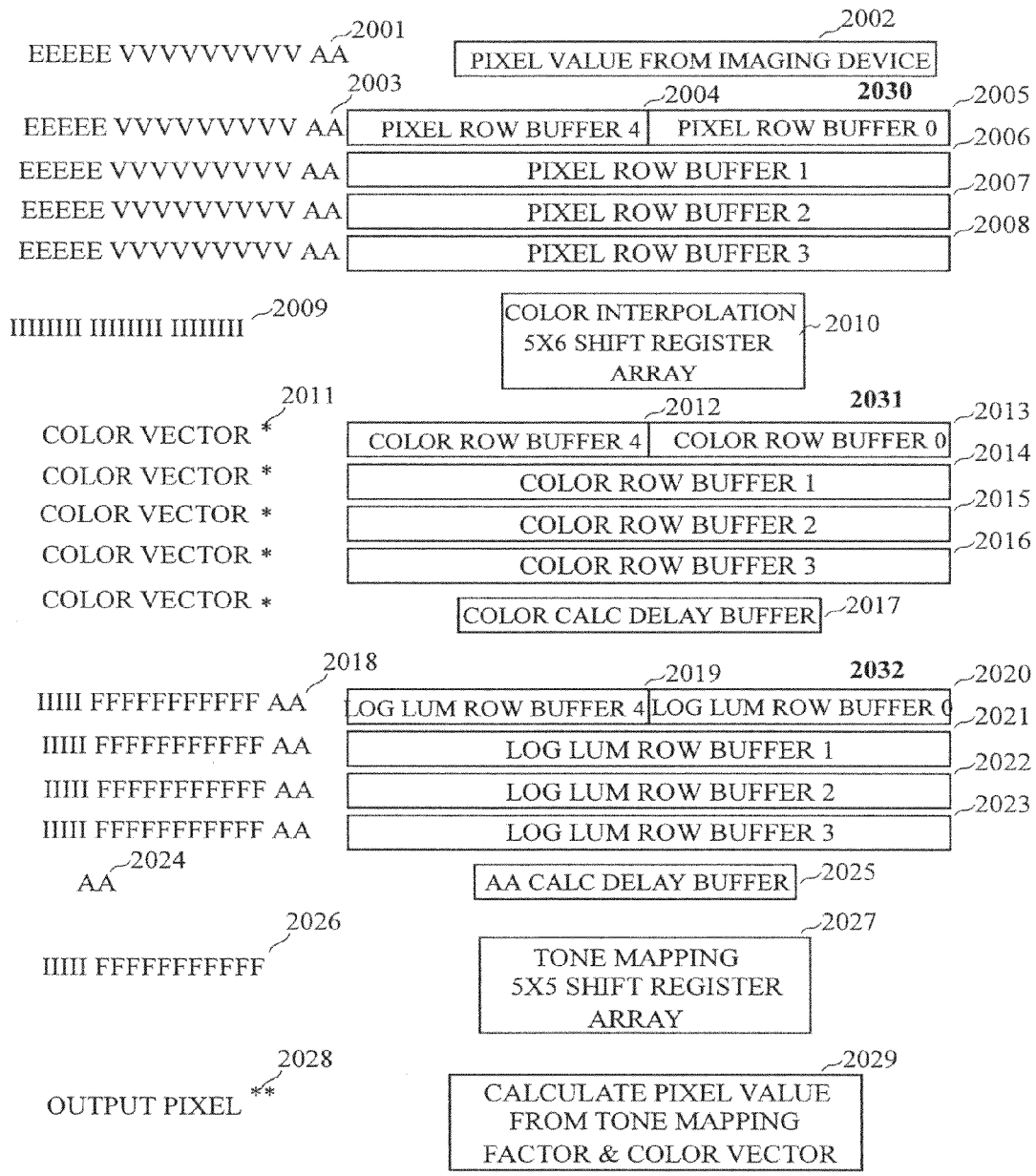
FIG. 20 depicts a simplified schematic of a preferred embodiment of the present invention implementing a multi-pattern based algorithm.

FIG. 20 depicts an example of data storage for a system that receives pixel values 2002 from an imaging device and buffers them for color interpolation preferably using the color interpolation circuit presented as part of this invention. The results of the color interpolation are then buffered for tone mapping preferably using the tone mapping circuit presented as part of this invention. For a 752×480 wide VGA image, the memory may, for example, be included in the block ram provided in a Spartan-6 SC6SLX9 FPGA, a product announced by Xilinx.

The logic to perform the color interpolation and the tone mapping is preferably included in the same silicon device as the memory blocks described herein. Examples of preferred data formats are depicted for each of the memory blocks in FIG. 20. 2002 represents a memory location that is preferably configured with a FIFO (First in first out) storage register to provide a preferably small buffer for pixels received from an imager or other image pixel data source that is typically streamed from the imaging device at a relatively consistent rate as it is acquired and processing of the pixel data is preferably begun with relatively little delay. The pixel order is preferably in sequence pixel by pixel for successive pixels in a row and row by row for successive rows in an image. The color interpolation and the bilateral filter operation in the tone mapping each operate on their own individualized supporting array of pixel data. Pixel data from the camera or other image source is used to supply data for the color interpolation, and the logarithm of the pixel luminance value is calculated using the color interpolated output of the color interpolation circuit. For color images acquired using an imager having a color filter array, color pixel values are used along with interpolated RGB (Red, Green, Blue) color pixel values as the data input for the tone mapping. In the examples, a 5 row by 6 column array of imager pixel data is used for the color interpolation and a 5 row by five column array of the calculated, logarithmically encoded pixel luminance values is used for the bilateral filter calculation in the first stage of the tone mapping. The sizes of the supporting arrays are given as examples and the invention is not limited to supporting arrays of this size. Furthermore, the sizes of the supporting arrays for the color interpolation and for the tone mapping do not need to be the same. To acquire n rows by m columns of supporting data for the a calculation, approximately n minus one times the number of pixels per row in the image plus m pixels of image data need to be buffered to provide pixel data over the full supporting array to perform the calculations for a given pixel. As explained and provided for elsewhere, at pixel locations that are near to one of the image boarders, pixel data may not be available for the full supporting array. Examples are given of ways to perform the calculation using pixel data that is available and calculations may be performed after the image data available for the supporting array is acquired bypassing buffering operations for data that is not available. The portion of the tone mapping calculation that utilizes the supporting array preferably operates on values in the array that are based on the logarithm of the luminance calculated for each interpolated pixel value so the calculated log luminance values, or at least the interpolated pixel color values needed to support this calculation need to be buffered for the n minus one full rows plus the m pixels to acquire the n rows by m columns of supporting pixel data. After the supporting array based bilateral filter portion of the tone mapping operation, the result of the bilateral filter calculation is used in additional calculations and is combined with the original pixel color component values to obtain the tone mapped pixel output values so the pixel color component values need to be saved in buffer memory while log luminance data calculated from the color pixel values is acquired and used for the supporting array for the tone mapping operation. For $n_c$ rows and $m_c$ columns of data in the supporting array of pixel values for the color interpolation and $n_t$ rows and $m_t$ columns of data in the supporting array of pixel values for the tone mapping operation $(n_c+n_t-2)$ times the image row length in pixels plus $(m_c+m_t)$ pixels need to be acquired, excepting abbreviated requirements for pixel locations that are close to a boarder of the image, to provide data to perform the combined color interpolation and tone mapping operations. A few additional pixel times may be needed to provide for pipelining delays in the calculations. For five rows of supporting data for the color interpolation and five rows of supporting data for the tone mapping operation, this requires only a little more than eight row times of delay and a little more than eight rows (four rows for each operation) of buffered data in comparison to 480 rows in the image used in the example. This represents only about 1.7 percent of the total image and minimizes the need for buffer memory and the added delay between acquisition and display or processing of an image for control applications.

In FIG. 20, pixel values acquired from an imager are acquired and optionally temporarily buffered in input register or buffering array 2002. After optional conversion in pixel format, values from buffering register/s 2002 are stored in imager data row buffer array 2030. Buffer arrays 2030, 2031, and 2032 are preferably organized in similar arrangements, so the most detail will be provided for 2030. The buffer is preferably configured for cyclical access so the newest pixel is entered at the last pixel location at the end of buffer area 2004 that provides storage for the portion of the newest row of pixel data being entered overwriting the corresponding portion of the oldest pixel data stored in the pixel area 2005. For n rows of supporting data, n−1 rows of storage are provided by partial rows 2004 and 2005, and full rows 2006, 2007, and 2008. Optionally, full rows of buffering space may be provided for each of the five rows of buffered data relaxing the need to carefully sequence access to data. A small number of temporarily storage locations for pixel data may be provided where needed to assure that pixel data needed for calculations may be acquired from the buffer 2030 before it is overwritten. Since the size of the memory blocks needed to provide row buffer space for imager pixel row buffer 2030, color vector row buffer 2031, and logarithmically encoded luminance value row buffer 2032 together consume a significant silicon area and the amount of memory needed to meet these storage requirements may be the limiting factor that determines the size and cost of an FPGA needed to implement the design for an FPGA based implementation, the preferred option to provide a shared space for the partial row storage needed for portions of the first and last rows of buffered image data is presented here. As indicated elsewhere, a column of pixel data is acquired simultaneously or in a preferably short time interval from buffer 2030 and after an optional format conversion is stored in the color interpolation register 2010 where it is used with adjacent columns of data previously saved in buffer area 2010 to provide ready access to the supporting kernel of pixel data for the color interpolation calculation. In a preferred sequence, to provide the new column of pixel values, one for each of the five rows of data in the kernel in the example, the pixel value about to be overwritten by the pixel from imager data from register 2002 is read from the beginning of pixel row buffer 0, and this value, the value about to be written to row buffer 4, and pixel values from corresponding pixel column locations in pixel row buffer 1 2006, pixel row buffer 2 2007, and pixel row buffer 3 2008, constitute the column of pixel values that are written to the working register array 2010 after optional format conversion. In a preferred implementation, the pixel value acquired from input register 2002 is then written to buffer register 2004 overwriting the value just read from pixel row buffer 0.

As just indicated, buffer area with partial color row buffer 4 2012 and color row buffer 0 2013 in a shared area and color row buffer areas for rows 1, 2, and 3 at 2014, 2015, and 2016 are preferably handled in a similar way so one should refer to 2030 for the more detailed description. As noted earlier, the number of rows of storage provided for buffer 2030 is preferably equal to the $n_c-1$ and the number of rows of storage provided for buffers 2031 and 2032 are preferably equal to $n_r-1$. $n_c$ and $n_r$ are both five in the example but either or both may be other values and $n_c$ does not need to equal $n_r$ to practice the invention. Color vector values in buffers 2031 and logarithmically encoded luminance values in 2032 are preferably entered at nearly the same time and since the logarithmically encoded luminance values are calculated based on the corresponding color vector value, the two separate buffers may be administered as a combined, shared structure or as a further option, the logarithmically encoded luminance value may not be buffered but calculated as needed. The complicating factor for implementing this option is that when the logarithmically encoded luminance values are not buffered their values need to be calculated once for each row in which they are used in the kernel or supporting array ($n_r$ or five times in the example) so the somewhat involved logarithmically encoded luminance computation may need to be repeated $n_r-1$ times after the first. Color vector values in 2031 generally need to be accessed for only one set of calculations to compute the final tone mapped pixel value and this may lead to some simplification in some applications so that buffer 2031 and color calculation delay buffer 2037 may optionally and even preferably for some applications be provided as a single first in first out or other block storage style of memory device. The only access needed in the preferred implementation is to read values from the first location of color row buffer 0 2013 before overwriting this location with the value input at the last location of color row buffer 4 2012. When the row correlated buffer as shown is used, color calculation delay buffer 2017 provides storage to cover the pixel processing time increments for the time that values are in the array 2027 during calculation and also additional pixel processing times to allow calculation pipeline delay times and scheduling times from the time that the value is read from color row buffer 2013 before it would otherwise be overwritten and the time that it is used in the calculation to provide the tone mapped pixel value.

The pixel acquisition information AA that is optionally included with the input pixel value is preferably buffered and kept correlated with the pixel for which it was generated and passed from the image pixel value input to the demosaiced, tone mapped pixel value output. The values AA are stored with the logarithmically encoded luminance value along with 16 bit logarithmically encoded luminance values to utilize the 18 bit storage locations provided in the Xilinx FPGA but may be buffered separately or may be grouped with the color vector values.

Examples of pixel data formats are given for an imager that provides high dynamic range pixel data encoded in a binary or other floating point data format. The data from the imager as indicated at 2001 may, as an example, be zero for zero values and may be fully normalized for nonzero values with the leading 1 in the binary value suppressed. The five bit binary exponent is EEEEE and the 9 bit binary value is VVVVVVVVV. AA is optional data associated with the pixel value that may, for example, indicate if the pixel value is the result of a saturated reading or of an under-utilized A/D range. Such indications may indicate that the illumination of the pixel varied over the integration time, perhaps due to a varying light source or the presence of a high contrast edge in a part of the scene that is in motion during the exposure. Other reasons for anomalies may be due to the choice of imaging device settings for the image acquisition. In all of these cases, the information provided by AA may be helpful in responding appropriately to the acquired image data. The indication, if provided may optionally be fewer or more than two bits long. Pixel data in buffer 2031 may optionally be stored in the same format as 2001 or optionally in integer form or in a modified floating point form. Data is preferably converted to binary integer form (24 bits in the example) for the color interpolation calculation.

In the preferred design, interpolated, high dynamic range, RGB color pixel values are provided by the color interpolation calculation and the luminance value is preferably calculated for each pixel value and preferably converted to a logarithm to the base 2 value having a binary encoding. This value may take the form of values 2018 of a five bit integral part IIIII and an eleven bit fractional part FFFFFFFFFFF. The value AA is grouped and stored with the 16 bit logarithmically encoded luminance value primarily to utilize the 18 bit width provided for memory blocks in the Xilinx FPGA. The red, blue, and green components of the pixel color components may each need 24 bits or more to represent them in binary integer format without losing resolution. As a preferred option, to preserve needed resolution and represent the color values more compactly, each color component is converted to a floating point or preferably to a logarithmically encoded format, preferably like, or at least compatible with the format of the logarithmically encoded luminance value calculated for the pixel and the logarithmically encoded luminance valued is preferably subtracted from each of the red, green, and blue logarithmically encoded color component values for the pixel to create the color vector values to store in the buffer area. The subtraction in the logarithmic space corresponds to division to provide the ratio of each color component to the luminance value in linear space. This logarithmically encoded ratio typically covers a smaller range than the original pixel color component value enabling a more compact representation of the pixel data. The color components, when expressed as a ratio of color component value to luminance so that the resulting ratio is a dimensionless value becomes transparent to tone mapping algorithms such as those provided herein so that the value is already in the same form that it assumes after tone mapping and its value is unchanged by the tone mapping, the entire content of each is incorporated herein by reference. In other words, the ratio becomes transparent to the tone mapping operation. Because the dimensionless ratio of the original color component to the luminance of the pixel is in a form that is not changed by the tone mapping operation, it is not subject to luminance compression factors that may deviate greatly from unity in the tone mapping operations. Thus, values representing the pixel color in dimensionless form may be encoded and stored in a resolution that supports its final use for rendering of the tone mapped image thereby reducing the buffer storage space and data link transmission bandwidth requirements. In many cases, the resolution needed for final rendering of the image may be supported by eight or fewer bits per color component. The preceding applies to RGB encoding but necessitates the redundant storage of three color components in addition to the logarithm of the luminance. It is preferable to use and convert to a color space that expresses luminance either directly or indirectly as one of its components. For example if the popular YUV pixel encoding is used where Y is luminance and U and V are color components, U/Y and V/Y are dimensionless as indicated and may be calculated before tone mapping and optionally expressed in logarithmic form. In calculation of the ratio, to avoid division by zero, a convention such as supplying a black equivalent for U/Y and V/Y (or R/Y, G/Y, and B/Y) may be used for this special case. The values just indicated may be used for the COLOR VECTOR values 2011. If the YUV or other color space having luminance as one of its components is used, since luminance Y is one of the three components, there are only two color dependent components rather than the three color dependent components present in the RGB color space. Then only the luminance term is affected by the tone mapping and only the U/Y and V/Y terms need to be stored in buffer 2031 during the tone mapping operation. If the RGB color space is used, only the separate luminance term is affected by the tone mapping operation and as with U/Y and V/Y, the R/Y, G/Y, and B/Y terms are transparent to tone mapping, but there are three terms instead of two. Since the logarithmically encoded luminance value is stored with the color vector value, the tone mapped pixel values in the form where they are not divided by the pixel luminance may be recovered by multiplying the color components expressed as dimensionless ratios by the tone mapped pixel luminance value to provide the tone mapped color pixel value. For logarithmically encoded values, addition of the logarithmically encoded pixel luminance to the logarithmically encoded color component in ratio form is the equivalent of taking the product of corresponding linearly encoded terms. If the pre tone mapped value is needed instead, then the color components that are in ratio form may be multiplied by the pixel luminance value that is not tone mapped. The advantage is that in the format just indicated, the pixel color information may be represented with reasonable resolution using fewer bits, (8 or 12 or fewer bits per color component in the examples as opposed to using as many as 24 bits or more in linearly encoded integer form) for each of the color components. The values generated as just described may, as an example, be encoded as a binary encoded logarithm to the base 2 with a four bit integral (signed or offset binary form) part IIII and an eight bit fractional part FFFFFFFF. Values that would otherwise be less than or greater than the range provided in the memory locations are preferably clamped to the corresponding minimum and maximum values for the range that is provided. In this way, values that might otherwise be badly in error if randomly clipped are set to their nearest equivalent value for the range provided.

Values 2003 stored in row buffer 2030 may optionally be left in the same floating point format as indicated for values 2001 as received or optionally converted to an alternate format such as integer form at the input stage. Values 2011 are converted to 24 bit binary encoded integer format as indicated at 2009, preferably as part of the operation to read them from buffer 2030 for use as source data for the color interpolation calculation in register 2010. The color vector 2011 is preferably encoded compactly as a ratio using one of the options described above and may, for example be encoded as a pair of 8 bit values that need only 16 bits of storage space. Alternatively, the color information may be encoded as a 36 bit value made up of three 12 bit logarithmically encoded values generated as indicated above, with the three values for the respective red, green, and blue pixel color components as depicted in the alternate version for the first note of FIG. 20. The logarithmically encoded luminance values with the optionally included pixel acquisition information AA are preferably encoded as described previously and the five bit binary value IIIII and 11 bit fractional value FFFFFFFFFFF along with AA represent the data format 2018 preferably stored in log luminance row buffer 2032. The log luminance values 2026 read from buffer 2032 are preferably read without inclusion of the pixel acquisition information AA and used, preferably in the format in which they are stored, as the data base for the bilateral filter calculation that uses values from tone mapping register array 2027 as the source of pixel kernel values for the bilateral filter calculation. The buffer 2025 provides buffer storage for pixel acquisition information AA during the time starting when this data would be overwritten if left in buffer 2032 and ending when it is included with the output pixel value 2028. The output pixel value preferably includes values that are successively subjected to color interpolation and then to the tone mapping operations. The values are preferably output in a form that is ready for additional image processing such as stitching or de-warping and/or feature recognition or display. This form may, for example, be an eight or more bit integer representation for each color component as indicated in the second note in FIG. 20 and may include the pixel acquisition information AA. Other bit lengths may be provided for pixel data depending on the application. The features indicated in FIG. 20 may be applied for configurations of the device that may, for example, include tone mapping but not color interpolation or color interpolation but not tone mapping. In these applications, data items not needed for the configurations may be omitted.

As pixel row buffer 4 expands to complete row 2005 and become a full row, pixel row buffer 0 shrinks to zero size. Calculations for pixels in the current row are completed for the border columns of pixels where pixels may be shifted to their appropriate positions in the array to perform calculations for pixels near the border prior to performing calculations for the next row of pixels. Options for finishing one row and beginning another include, shifting the pixels in the array 2010 to assume their correct positions for calculations for pixel locations near the right border of the array without introducing new columns of pixels that would be outside of the border, or entering new columns of pixels that are offset by one row and shifting them into the array as calculations are completed for pixels near the border of the previous row. In this case, columns of pixel values shifted in to initialize portions of the array 2010 for calculations for pixel locations in the next row are not accessed until calculations for pixel locations in the current row are complete and calculations for pixel locations in the next row for which they are properly aligned are begun. Then when calculations for pixel locations in the next row begin, pixels in columns at the start of the row will already be in the array 2010 and calculations for pixel locations in this new row may be initiated and pixels remaining in the array from calculations for pixel locations in the previous row should not be accessed for calculations for pixels near the border in the new row. When pixel row buffer 4 expands to fill all of row 2005 and pixel row buffer 0 shrinks to zero and ceases to exist, the row buffer numbering as depicted is all decremented by one at the start of the new row and pixel row buffer 4 in row 2005 becomes the new pixel row buffer 3 and pixel row buffer 1 in row 2006 now becomes the new pixel row buffer 0 and pixels are added to a newly formed pixel row buffer 4 at the start of row 2006. Thus, the row buffer locations associated with given rows in array 2010 advance cyclically by one row in row buffer array 2030 and this advance results from the incremental advance in rows in the image used for calculations related to pixels in successive rows of the image and data in row buffer 2030 is not moved but the row to which new pixel values are written overwriting the oldest pixel value advances cyclically through the array. For processing successive rows of image data, the row with the dual partial buffer interface progresses to the last row 2008 of the buffer array 2030 and then cycles back to row 2005 of the cyclic array.

The description here for buffer array 2030 and its associated calculation supporting array 2010 may be applied to row buffer array 2032 and the associated tone bilateral filter calculation supporting array 2027. In this case, the same kind of control to restrict access to values in the array 2027 that are outside of the image border or replace these values with zero or with another value appropriate to the calculation may be implemented to provide the same options in transitioning from one row to the next as are provided for the color interpolation calculations associated with buffer array 2030.

It should be understood that the above detail description is provided for enabling one of ordinary skill in the art to make and use the invention as recited in the appending claims. In no way should this description be interpreted as limiting the scope of the invention to any given embodiment, therefore, the appending claims are intended to include all equivalent structure and equivalent function within the respective scope.

What is claimed is:

1. An apparatus, comprising:
circuitry for performing at least a portion of the calculations associated with an algorithm for mapping a high dynamic range digital image onto a display medium having a dynamic range lower than said high dynamic range digital image, said algorithm is configured to:
receive a high dynamic range digital image and decompose said high dynamic range digital image into an intensity layer and a color layer,
bilateral tone map said intensity layer to obtain a first contrast reduction factor,
modulate said first contrast reduction factor with a rational expression to obtain a second contrast reduction factor, wherein said rational expression is automatically adjusted to a compression factor based upon data from substantially an entire frame, and
alter said high dynamic range digital image using said second contrast reduction factor to obtain a second digital image having a dynamic range lower than said high dynamic range digital image.

2. An apparatus as in claim 1 configured to receive a series of high dynamic range digital images from a high dynamic range source and output a second series of digital images having a dynamic range lower than said series of high dynamic range digital images.

3. An apparatus as in claim 2 wherein said series of high dynamic range digital images is received at a rate greater than, or equal to, thirty images per second.

4. An apparatus as in claim 3 wherein said second series of digital images is output at a rate greater than, or equal to, thirty frames per second.

5. An apparatus, comprising:
circuitry for performing at least a portion of the calculations associated with an algorithm for mapping a high dynamic range digital image onto a display medium having a dynamic range lower than said high dynamic range digital image, said algorithm is configured to:
receive a high dynamic range digital image and decompose said high dynamic range digital image into an intensity layer and a color layer,
bilateral tone map said intensity layer to obtain a first contrast reduction factor,
modulate said first contrast reduction factor with a rational expression to obtain a second contrast reduction factor, wherein said rational expression is automatically adjusted to change a compression factor based upon data from substantially an entire frame, and
recombine said color layer and said intensity layer using said second contrast reduction factor to obtain a second digital image having a dynamic range lower than said high dynamic range digital image,
said apparatus further comprising circuitry for performing at least a portion of the calculations associated with an algorithm for calculating and supplying missing color data, said algorithm is configured to:
receive a spectrally mosaiced digital image and to calculate and supply missing color data, said algorithm implements a patterned based look-up table.

6. An apparatus as in claim 5 configured to receive a series of high dynamic range digital images from a high dynamic range source and output a second series of digital images having a dynamic range lower than said series of high dynamic range digital images.

7. An apparatus as in claim 6 wherein said series of high dynamic range digital images is received at a rate greater than, or equal to, thirty images per second.

8. An apparatus as in claim 7 wherein said second series of digital images is output at a rate greater than, or equal to, thirty frames per second.

9. An apparatus as in claim 5 configured to receive a series of mosaiced digital images from an imaging device and output a second series of digital images having missing color data added.

10. An apparatus as in claim 9 wherein said series of high dynamic range digital images is received at a rate greater than, or equal to, thirty images per second.

11. An apparatus as in claim 10 wherein said second series of digital images is output at a rate greater than, or equal to, thirty frames per second.

* * * * *